(12) United States Patent
Brown

(10) Patent No.: US 12,687,188 B2

(45) Date of Patent: Jul. 21, 2026

(54) WALL ANCHOR

(71) Applicant: Forth View Designs Ltd., Glasglow (GB)

(72) Inventor: Peter Brown, Glasglow (GB)

( * ) Notice: Subject to any disclaimer, the term of this patent is extended or adjusted under 35 U.S.C. 154(b) by 0 days.

(21) Appl. No.: 18/579,585

(22) PCT Filed: Jul. 15, 2022

(86) PCT No.: PCT/GB2022/051840

§ 371 (c)(1),
(2) Date: Jan. 16, 2024

(87) PCT Pub. No.: WO2023/285837

PCT Pub. Date: Jan. 19, 2023

(65) Prior Publication Data

US 2024/0318678 A1     Sep. 26, 2024

(30) Foreign Application Priority Data

Jul. 16, 2021     (GB) ..................................... 2110255

(51) Int. Cl.
F16B 13/08          (2006.01)
F16B 13/00          (2006.01)

(52) U.S. Cl.
CPC ........ F16B 13/0808 (2013.01); F16B 13/002 (2013.01); F16B 13/08 (2013.01)

(58) Field of Classification Search
CPC .... F16B 13/0808; F16B 13/08; F16B 13/002; F16B 37/02

USPC ...................................... 248/231.91; 411/340
See application file for complete search history.

(56)          References Cited

U.S. PATENT DOCUMENTS

| | | | | |
|---|---|---|---|---|
| 1,073,998 | A | * | 9/1913 | Lundin ............... F16B 13/0808 |
| | | | | 411/922 |
| 1,521,025 | A | * | 12/1924 | Hubener ................. F16B 37/04 |
| | | | | 411/965 |
| 2,203,146 | A | * | 6/1940 | Hexdall .............. F16B 13/0808 |
| | | | | 24/453 |
| 2,285,273 | A | * | 6/1942 | Hall .................... F16B 13/0808 |
| | | | | 411/918 |
| 2,398,220 | A | * | 4/1946 | Gelpcke .............. F16B 13/0808 |
| | | | | 411/342 |
| 2,567,935 | A | * | 9/1951 | Lay .......................... F16B 15/04 |
| | | | | 411/61 |
| 2,916,235 | A | * | 12/1959 | Heinri ...................... A47G 1/20 |
| | | | | 248/231.91 |

(Continued)

FOREIGN PATENT DOCUMENTS

| | | | | |
|---|---|---|---|---|
| CH | 711004 | A2 * | 10/2016 | .......... F16B 13/0808 |
| DE | 10143695 | A1 | 5/2002 | |

(Continued)

*Primary Examiner* — Taylor Morris

(57)          ABSTRACT

There is described provides a wall anchor for fixing to a hollow wall, such as a plasterboard wall, wherein said anchor comprises an L-shaped portion with a first arm and a second arm, an elongate back portion adapted to engage the inner surface of the wall, a hinge which connects the second arm of said L-shaped portion to said elongate back portion, and a resilient member which urges the elongate back portion to adopt a substantially perpendicular position relative to the second arm of the L-shaped portion. A method of deploying the wall anchor is also described.

18 Claims, 18 Drawing Sheets

(56)                References Cited

U.S. PATENT DOCUMENTS

| | | | | |
|---|---|---|---|---|
| 3,547,389 A | * | 12/1970 | Mitchell | E06B 9/171 |
| | | | | 248/231.91 |
| 3,605,547 A | | 9/1971 | Millet | |
| 3,651,734 A | * | 3/1972 | McSherry | F16B 21/088 |
| | | | | 411/970 |
| 4,810,146 A | * | 3/1989 | Sinclair | F16B 13/0808 |
| | | | | 411/342 |
| 4,997,327 A | * | 3/1991 | Cira | F16B 13/0808 |
| | | | | 411/340 |
| 5,412,848 A | * | 5/1995 | Precourt, Jr. | A44B 5/005 |
| | | | | 24/99 |
| 5,472,304 A | | 12/1995 | Gold | |
| 6,036,149 A | | 3/2000 | Del Pino | |
| 6,196,506 B1 | | 3/2001 | Wakai | |
| 6,318,941 B1 | * | 11/2001 | Guenther | F16B 13/0808 |
| | | | | 411/344 |
| 6,679,664 B2 | * | 1/2004 | Ikuta | F16B 13/0808 |
| | | | | 411/427 |
| 6,866,458 B2 | * | 3/2005 | Farrell | F16B 15/06 |
| | | | | 411/462 |
| 7,752,732 B2 | | 7/2010 | Brown et al. | |
| 8,109,705 B1 | | 2/2012 | Brown et al. | |
| 8,764,364 B2 | | 7/2014 | Brown et al. | |
| 8,807,899 B2 | * | 8/2014 | Spencer, Jr | A47K 17/022 |
| | | | | 411/85 |
| 8,950,992 B1 | * | 2/2015 | Vayntraub | F16B 13/04 |
| | | | | 411/344 |
| 10,927,872 B2 | * | 2/2021 | Wakai | F16B 13/0808 |
| 2009/0169331 A1 | * | 7/2009 | Pilon | F16B 13/0808 |
| | | | | 411/345 |
| 2015/0083873 A1 | * | 3/2015 | Garpow | F16B 15/0046 |
| | | | | 248/231.91 |
| 2016/0341233 A1 | * | 11/2016 | Sobel | F16B 13/0808 |
| 2018/0003206 A1 | | 1/2018 | Mcduff et al. | |

FOREIGN PATENT DOCUMENTS

| | | | | | |
|---|---|---|---|---|---|
| FR | 2471508 A1 | * | 6/1981 | | F16B 37/04 |
| GB | 636551 A | * | 5/1950 | | F16B 13/0808 |
| GB | 2215420 A1 | | 9/1989 | | |
| GB | 2330887 A | * | 5/1999 | | F16B 13/0808 |
| GB | 2584396 A1 | | 12/2020 | | |
| JP | 2002089531 A | * | 3/2002 | | F16B 13/0808 |
| JP | 4060415 B1 | | 12/2007 | | |
| JP | 4060415 B2 | | 3/2008 | | |
| NL | 2002187 C2 | * | 5/2010 | | F16B 37/044 |

* cited by examiner

WALL ANCHOR

The present invention relates to a wall anchor, and in particular relates to a wall anchor for fixing to a hollow wall, such as an internal wall formed with plasterboard.

BACKGROUND TO THE INVENTION

Many wall fixings require a hole of a specified size to be pre-drilled into a wall prior to insertion of a wall fitting, for example a "wall plug" type fitting. Drilling the hole requires the use of a drill, and therefore requires a degree of expertise and access to a suitable electric or hand drill. Additionally, pre-drilling each hole is relatively time-consuming. This remains the position even where the wall is of a plasterboard type. Locating a fixing into a plasterboard wall also has the difficulty that the hole formed can be inadvertently enlarged (due to the friable nature of the plasterboard wall) meaning that any fixing may not be fixed securely. There remains a need for an improved wall fixing for a plasterboard-style wall which is easy to fit and does not require a pre-drilled hole.

GB2215420 describes a wall fixing for a plasterboard-style internal wall, but requires a pre-drilled hole so that the fitting can be inserted through the hole before being fastened using a screw.

SUMMARY OF THE INVENTION

The present invention provides a wall anchor for fixing to a hollow wall, wherein said anchor comprises an L-shaped portion having a first arm and a second arm, a hinge which connects the second arm of said L-shaped portion to an elongate back portion adapted to engage the inner surface of the wall, and a resilient member which urges the elongate back portion to adopt a substantially perpendicular position relative to the second arm of the L-shaped portion.

A kit comprising a wall anchor according to the invention together with a holding means suitable for use with the wall anchor (for example a screw) is also provided.

The invention further provides a method of deploying the wall anchor of the invention such that the wall anchor spans a hollow wall (such as a plasterboard wall).

DETAILED DESCRIPTION OF THE INVENTION

Figure 1:
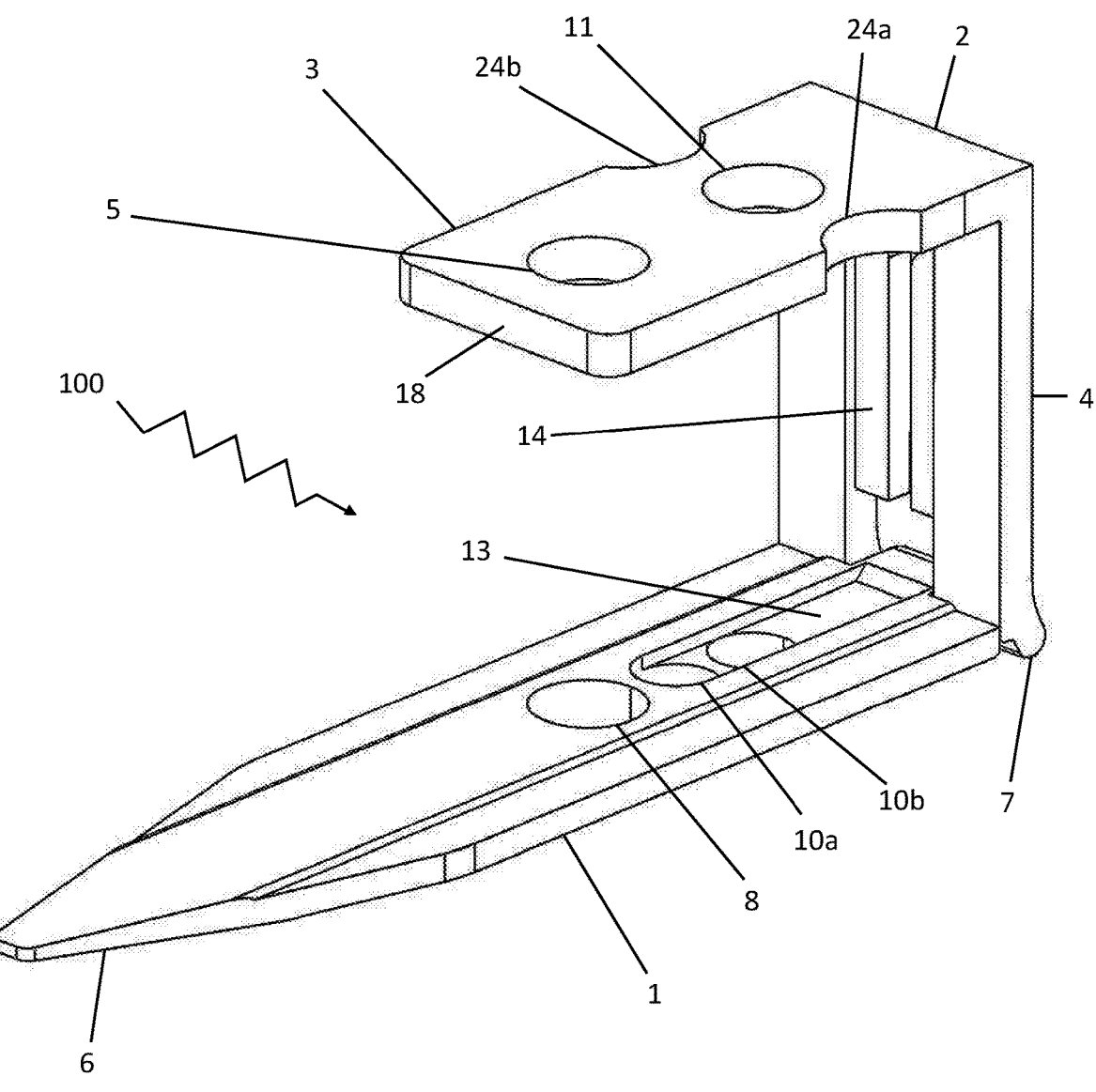
FIG. 1: shows a perspective view of one embodiment of the wall anchor, excluding the resilient member.

The wall anchor of the present invention is now described in further detail.

The wall anchor of the present invention, prior to deployment, is substantially U-shaped, with the U-shape being formed by the elongate back portion in combination with the L-shaped portion. The L-shaped portion is formed of two arms: a first arm and a second arm. The two arms of the L-shaped portion are approximately perpendicular to each other. The second arm of the L-shaped portion engages with the elongate back portion via a hinge. The elongate back portion is substantially parallel (prior to deployment) with the first arm of the L-shaped portion. However, the elongate back portion is desirably longer than the first arm of the L-shaped portion, to provide a large area of contact with the inner surface of the hollow wall. The resilient member is located on the elongate back portion, spans across the wall anchor, and is located on the first arm of the L-shaped portion by a retaining means, for example retaining notches.

The L-shaped portion is formed of a first arm and a second arm held in a fixed arrangement, wherein the first and second arms are substantially perpendicular to each other. Optionally, the L-shaped portion can be formed in one piece or alternatively the two portions are be joined together in a fixed arrangement by suitable fixing or joining means or by means of a "snap-fit" arrangement. Conveniently the L-shaped portion can be formed from plastics materials, for example from mouldable or extrudable plastics. Nonlimiting examples of suitable materials include polyethylene (e.g., high density polyethylene), nylon, polypropylene, polylactic acid (PLA) and the like. The L-shaped portion can conveniently be formed from cast or moulded plastics. Alternatively, the L-shaped portion can be formed from a suitable metal, for example steel. Optionally one or both arms of the L-shaped portion may be formed from a plastics material having a metal reinforcement.

Optionally, the second arm of the L-shaped portion is sized to be able to span the width of a hollow wall, for example to span the width of a plasterboard sheet.

In one embodiment, in use, and after deployment, the first arm of the L-shaped portion remains visible on the wall.

In an alternative embodiment, the first arm of the L-shaped portion can be removeable. For example, the first arm can be formed from two spaced sections, allowing removal of the first arm after deployment of the wall anchor. Depending on the intended purpose for the wall anchor, removal of the first arm after deployment can be more aesthetically pleasing.

The first arm of the L-shaped portion includes an aperture for receiving a holding means, such as a screw. The aperture is generally positioned towards the distal end of the first arm of the L-shaped portion. Optionally, the internal circumference of the aperture may be adapted for engagement with a screw. For example, the internal circumference of the aperture may include a helical thread corresponding to the helical thread of the screw to be used. In another example, the internal surface of the aperture is formed of a sufficiently soft material that a screw can form an incision, or series of incisions, in the material when the screw is inserted through the aperture. In this embodiment the screw can be a self-tapping screw and taps a hole through the material within the aperture. Optionally, the internal surface of the aperture may be an insert of suitable material to enable the screw to be tapped therethrough.

Optionally, the elongate back portion terminates with a pointed region, located distal to the hinge of the wall anchor. The pointed region facilitates penetration of the wall anchor through the hollow wall (e.g., plasterboard internal wall) without the need for a pre-drilled hole. Rather, the pointed end of the back portion can be positioned at the required position for location of the wall anchor and then the back portion can be driven through the hollow wall (e.g., plasterboard wall), for example by applying force to the wall anchor, for example by simply knocking the wall anchor with a hammer. Optionally, to facilitate the wall anchor being driven through the hollow wall (e.g., plasterboard wall), the back portion is rotated at the hinge to be in a continuous plane with the second arm of the L-shaped portion. This causes the resilient member to be stretched and placed under tension whilst the wall anchor is being driven through the hollow wall (e.g., plasterboard). Alternatively, the wall anchor is initially maintained in its U-shaped configuration whilst the pointed end of the back portion is driven into the hollow wall (e.g., plasterboard). In this option, pressure can be applied to the second arm of the L-shaped portion at least until the first arm of the L-shaped portion approaches the outer surface of the wall. At this stage, the first arm of the L-shaped portion can then be rotated at the hinge, and the wall anchor pushed manually through the hole formed by the back portion.

The back portion includes an aperture for receiving a holding means, such as a screw. Optionally, the internal circumference of the aperture may be adapted for engagement with a screw. For example, the internal circumference of the aperture may include a helical thread suitable for engagement with the helical thread of the screw to be used as the holding means. In another example, the internal surface of the aperture is formed of a sufficiently soft material that a screw can form an incision, or series of incisions, in the material when the screw is tapped through the aperture. In this embodiment the screw can be a self-tapping screw and taps a hole through the material within the aperture. Optionally, the internal surface of the aperture may be an insert of suitable material to enable the screw to be tapped therethrough.

The aperture for receiving a holding means in the back portion is aligned with the aperture for receiving a holding means in the first arm of the L-shaped member, when the back portion is substantially perpendicular to the second arm of the L-shaped member. Thus, a screw or other holding means can be inserted through the aperture in first arm of the L-shaped member, pass through the wall and then be inserted through the aperture in the elongate back portion. The holding means can be tightened to pull the elongate back portion and the first arm of the L-shaped member together, so that each is held firmly either side of the wall.

Conveniently the back portion can be formed from plastics materials, for example from mouldable or extrudable plastics. Non-limiting examples of suitable materials include polyethylene (e.g., high density polyethylene), nylon, polypropylene, polylactic acid (PLA) and the like. The back portion can conveniently be formed from cast or moulded plastics. Alternatively, the back portion can be formed from a suitable metal, such as steel. The back portion may be formed from the same or different material as the L-shaped portion. Optionally the back portion may be formed from a plastics material having a metal reinforcement.

In use, and after deployment, the back portion is located on the internal (non-visible) side of the hollow wall (e.g., plasterboard wall), and lies flush against the wall surface, thereby spreading any load carried by the wall anchor.

The resilient member can be formed from any suitable material and be in any suitable shape. The resilient member can be formed from any suitable elastomer which has the resilience to stretch and to return to its original size. Mention can be made of polybutadiene, polyisoprene (e.g., natural rubber), silicone and the like. Optionally, the resilient member can be a spring, such as a tension spring. The resilient member will be sized so that it urges the back portion to adopt a position which is substantially perpendicular to the second arm of the L-shaped portion. However, the resilient member must also allow the back portion to flex through approximately 90 degrees so that it can be positioned in the same plane as the second arm of the L-shaped portion, thereby essentially forming a continuation of the second arm of the L-shaped member. The resilient member will be sized and shaped to avoid snagging on the hollow wall (e.g., plasterboard wall) as the wall anchor is deployed therethrough. Conveniently, the resilient member can be a loop of elastic material, for example a loop of resilient rubber, for example an elastic band. The resilient member is attached to the back portion of the wall anchor and is also attached to the first arm of the L-shaped portion. The length of the resilient member will be determined by the size of the wall anchor.

In one embodiment, where the resilient member is a loop of elastic material, the back portion can comprise two apertures enabling the loop of elastic material to be passed through the both apertures, and then looped through itself, thereby attaching it to the back portion of the wall anchor. Additionally, the first arm of the L-shaped portion can also include an aperture through which the free end of the loop of elastic material can be passed, before being located on retaining notches at each side of the first arm. The reverse arrangement could also be adopted. In an alternative embodiment, either the first arm and/or the back portion can include an aperture with at least one internal lug. In this embodiment, the resilient member can be located and held in place by the lug(s). Optionally the lug can be located in an aperture used only for the resilient member. Optionally the lug can be located in an aperture also used for the holding means. Optionally, the resilient member can be passed through one aperture and then located on a lug in a different aperture. For example, the resilient member can be passed through an aperture and then located on a lug in the aperture also used for the holding means. This arrangement can conveniently be used in the back portion. Optionally, the or each lug(s) can include an end stopper to prevent the resilient member from sliding off the lug during deployment of the wall anchor. Optionally, both the first arm and the back portion include a single aperture bearing an internal lug (optionally including end stoppers) around which the resilient member is located. Other alternative ways of attaching the resilient member to the back portion and/or to the first arm are also possible. For example, the resilient member can be linear and can comprise end stoppers which prevent each end from being pulled through apertures in the back portion and first arm. Alternatively, the back portion and/or first arm can include a catch or other means to firmly hold one end of the resilient member. Alternatively, the resilient member can be attached to the back portion and/or first arm by adhesive or by any other holding means.

Optionally, to facilitate the wall anchor being passed through the hollow wall (e.g., plasterboard wall) without snagging the resilient member, the wall anchor can comprise a recess on the internal surface of the back portion, a recess on the internal surface of the second arm of the L-shaped portion and a recess on the internal surface of the first arm of the L-shaped portion. The recesses can be continuous with each other and can be sized to be able to accommodate the resilient member. Thus, the resilient member can be located within these recesses so that it does not snag or foul on the wall during deployment of the wall anchor.

As noted above, prior to deployment, the back portion is held in a substantially perpendicular position relative to the second arm of the L-shaped portion and is urged into this position by the resilient member.

In one option, to deploy the wall anchor, the back portion is manually rotated about the hinge until it is in substantially the same plane as the second arm of the L-shaped portion, and thereby essentially forms an extension of the second arm of the L-shaped portion. The back portion is held in this position whilst the wall anchor is located into the hollow wall (e.g., plasterboard wall). The distal (pointed) end of the back portion is then placed at the required position for location of the wall anchor and the back portion is driven through the hollow wall (e.g., plasterboard wall), for example by application of a force to the first arm of the L-shaped portion. This can conveniently be achieved by tapping the face of the first arm of the L-shaped portion with a hammer until the whole of the back portion has been driven through the hollow wall (e.g., plasterboard wall), and also the second arm of the L-shaped portion has been driven into the hollow wall (e.g., plasterboard wall) so that it spans the width of the wall. Once the hinge (located at the distal end of the second arm of the L-shaped portion) is free of the hollow wall (e.g., plasterboard wall), the resilient member causes the back portion to rotate until the back portion is once again substantially perpendicular to the second arm of the L-shaped portion, and is lying flush against the internal surface of the wall. Once in this position, the aperture for receiving a holding means in the back portion is aligned either side of the hollow wall (e.g., plasterboard wall) with the aperture for receiving a holding means in the first arm of the L-shaped member. This allows a suitably sized screw (or other holding means) to be inserted through the aperture in the first arm of the L-shaped member, through the wall itself, and then located through the aperture in the back portion of the wall anchor. Since the aperture for receiving a holding means in the back portion includes an internal female thread adapted to cooperate with the male thread of the screw, the screw can be tightened to ensure firm fixation of the wall anchor.

In an alternative option, to deploy the wall anchor, the wall anchor is maintained in its U-shaped configuration. The distal (pointed) end of the back portion is then placed at the required position for location of the wall anchor and the back portion is driven through the hollow wall (e.g., plasterboard wall), for example by application of a force to the second arm of the L-shaped portion. This can conveniently be achieved by tapping the face of the second arm of the L-shaped portion with a hammer until a sufficient length of the back portion has been driven through the wall that the first arm of the L-shaped portion close to the surface of the wall. At this stage, the second arm of the L-shaped portion can be rotated at the hinge, and the second arm of the L-shaped portion can be manually pushed into the hole formed by the back portion in the hollow wall (e.g., plasterboard wall) until the second arm spans the width of the wall. Once the hinge (located at the distal end of the second arm of the L-shaped portion) is free of the wall, the resilient member causes the back portion to rotate until the back portion is once again substantially perpendicular to the second arm of the L-shaped portion, and is lying flush against the internal surface of the wall. Once in this position, the aperture for receiving a holding means in the back portion is aligned either side of the hollow wall (e.g., plasterboard wall) with the aperture for receiving a holding means in the first arm of the L-shaped member. This allows a suitably sized screw (or other holding means) to be inserted through the aperture in the first arm of the L-shaped member, through the wall itself, then located through the aperture in the back portion of the wall anchor. Since the aperture for receiving a holding means in the back portion includes an internal female thread adapted to cooperate with the male thread of the screw, the screw can be tightened to ensure firm fixation of the wall anchor.

In one embodiment, the first arm is in a split arrangement, that is the first arm is formed from two sections which are separated by a gap therebetween, with each section extending essentially perpendicularly from second arm. The L-shaped member is formed from the combination of the second arm and the two first arm sections. The first arm will still contain an aperture for the holding means, for example the aperture can be formed partially by an inner concave edge portion in each of the first arm sections in combination with the width of the gap therebetween. Likewise, the first arm will still contain a means for retaining the resilient member. For example, a single aperture formed by a combination of an inner concave edge portion in each of the first arm sections in combination with the width of the gap therebetween can be used together with retaining notches on the outer edge of each first arm section which can hold the resilient member in a looped over configuration. Alternatively, one or each first arm section can include a retaining lug to retain the resilient member.

Using the alternative split arrangement for the first arm, enables each of the first arm sections to be removed once the wall anchor has been fully deployed and the holding means tightened. Once the holding means has been tightened such that the back portion has been fixedly attached onto the internal (back) face of the wall, the first arm is essentially redundant for holding the wall anchor in place. Retention of the first arm can detract aesthetically from the wall anchor since this portion of the wall anchor would otherwise be visible on the external (front) face of the wall. Accordingly, once the holding means has been adequately tightened, the front arm sections can simply be "snapped off" or otherwise removed from the wall anchor and, if required, the holding means can then be tightened further. Optionally, the junction between the second arm and each of the first arm sections can include an area which facilitates the removal of the first arm sections, for example can include a thinner profile, perforations or a scored area or the like. Once the first arm sections have been removed, the resilient member will retract behind the wall or can simply be removed.

Optionally other desired fittings (e.g., hooks, eyelets, brackets or the like) can be positioned between the fastening means and the first arm of the L-shaped portion. In this way, the wall anchor can be used to mount the required items onto the wall. Alternatively, such fixings can be integral to the holding means selected.

Preferred or alternative features of each aspect or embodiment of the invention apply mutatis mutandis to each other aspect or embodiment of the invention (unless the context demands otherwise).

The present invention will now be further described with reference to the figures, which further illustrate the invention.

FIG. 1 shows a perspective view of one embodiment of the wall anchor (100) according to the invention in a configuration prior to deployment. The resilient member (9) is not shown for clarity. Wall anchor (100) is formed in a general U-shape created by an elongate back portion (1) in combination with an L-shaped portion (2). The L-shaped portion (2) is formed of two arms: a first arm (3) and a second arm (4). The two arms (3, 4) of the L-shaped portion (2) are approximately perpendicular to each other. The second arm (4) of the L-shaped portion (2) engages with the elongate back portion (1). As illustrated, elongate back portion (1) is substantially parallel with the first arm (3) of the L-shaped portion (2). As shown, the elongate back portion (1) is longer than the first arm (3) and projects beyond the free end (18) of the first arm (3). The extended length of the back portion (1) provides a large area of contact to the inner surface of the hollow wall following deployment of the wall anchor (100). Elongate back portion (1) terminates with a tapered and pointed region (6). The shape of pointed region (6) allows the wall anchor (100) to be driven into and through a hollow wall (e.g., plasterboard wall) more easily. Second arm (4) of the L-shaped portion (2) is connected to the elongate back portion (1) via a hinge (7). As illustrated, second arm (4) is formed integrally with the first arm (3) of the L-shaped portion (2). Alternatively, the two arms (3, 4) of the L-shaped portion can be formed independently and then fixedly secured together by any suitable means.

In the embodiment shown in FIG. 1, first arm (3) of the L-shaped section (2) includes an aperture (5), which is located centrally within the width of arm (3) and towards its free end (18). A corresponding aperture (8) is located in back portion (1). Apertures (5, 8) are aligned such that once the wall anchor (100) is fully deployed, a screw or other holding means (not shown) can be positioned to pass through both apertures (5, 8), and to pull back portion (1) towards first arm (3) inwardly together on either side of the wall, thereby further securing the wall anchor (100) securely. Apertures (5, 8) may each be adapted for engagement with a screw, i.e., to include a helical thread corresponding to the helix of the screw to be used or to include a coating or insert which is adapted to be cut (tapped) by the thread of a screw as the screw is rotated.

First arm (3) of the L-shaped section (2) includes aperture (11) and elongate back portion (1) also includes apertures (10a, 10b) for attachment of a resilient member (9), not shown in FIG. 1. Apertures (10a, 10b) can be used to attach one end of the resilient member (9), which could conveniently be an elastic band or loop. For example, the resilient member (9) can be looped through each of apertures (10a, 10b) and then one end of the loop passed through the second end of the loop to form a knot. This securely fastens the resilient member (9) to the back portion (1) of the anchor (100). The free end of the resilient member (9) can then be passed through aperture (11) of first arm (3) and then securely located onto notches (24a, 24b) located either side of aperture (11). Other attachment methods for the resilient member (9) could alternatively be used, provided the resilient member can be securely fastened to the back portion (1) of the anchor (100) and also to first arm (3) of the L-shaped portion (2) of the anchor (100). For example, aperture (11) could include a lug protruding into the lumen of aperture (11) as described later for FIG. 16. Likewise, apertures (10a, 10b) could be replaced by a single aperture in back portion (1), this single aperture also having an internally protruding lug (see FIG. 16) around which the resilient member (9) can be located in order to connect back portion (1) to first arm (3). Alternatively, the resilient member could be attached by other means, e.g., a clip or adhesive.

A recess (13) in the internal surface of the back portion (1) and a continuing recess (14) in the internal surface of the second arm (4) of the L-shaped portion (2) are also shown. A further recess (not shown) extends recess (14) on the internal surface of first arm (3). Recesses (13, 14) and the continuing recess on the internal surface of first arm (3) are sized and shaped to receive the resilient member (9) during deployment of anchor (100) so that the resilient member (9) sits compactly within the anchor (100) and also reduces the possibility of the resilient member (9) to snag on the wall (15) during deployment of the anchor (100). The recesses (13, 14) and the continuing recess on the internal surface of first arm (3) are not absolutely required for deployment of the wall anchor (100) but can be helpful in preventing the resilient member becoming snagged during deployment.

Figure 2:
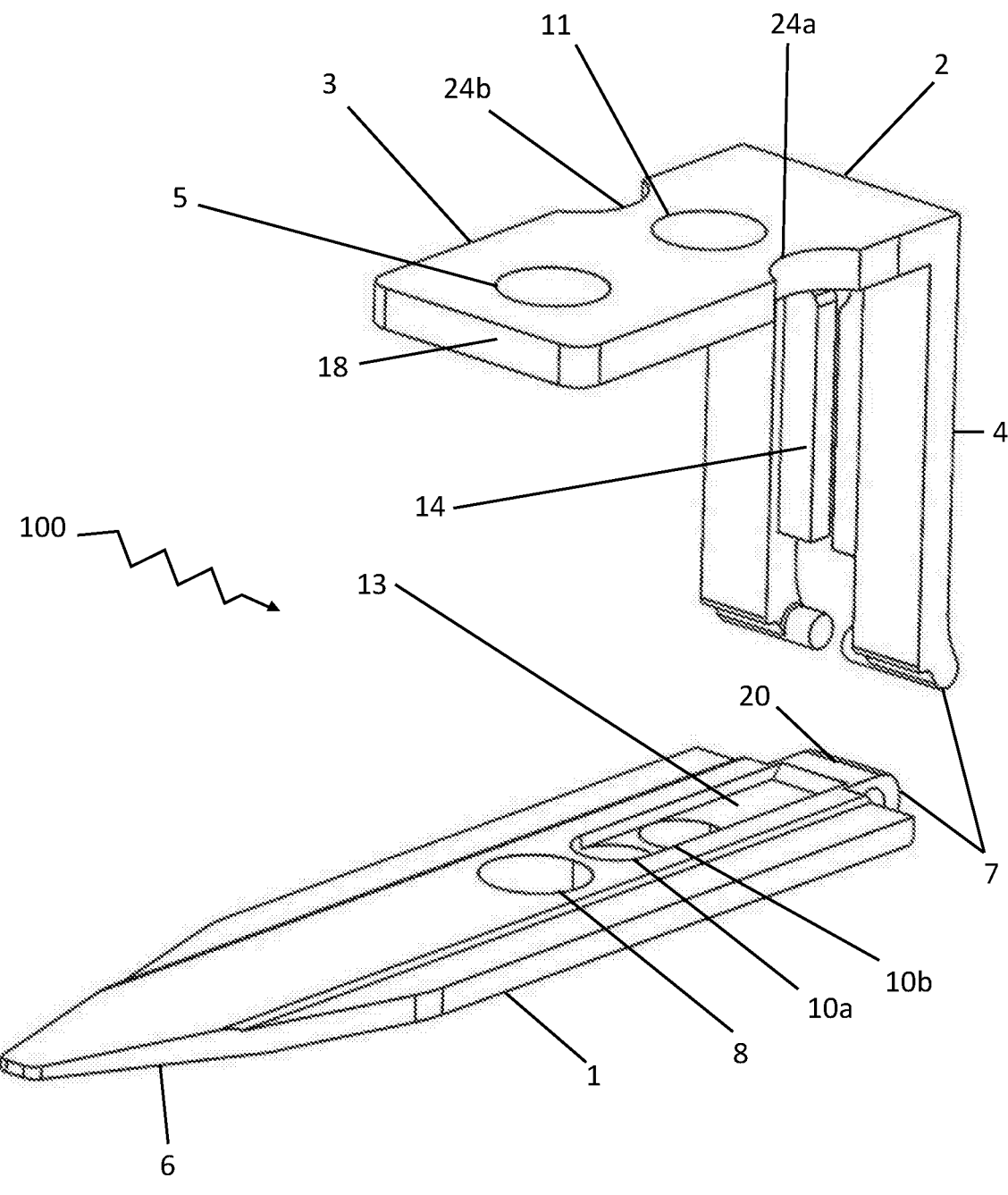
FIG. 2: shows a perspective view of the wall anchor of FIG. 1, with the elongate back portion and the L-shaped portion separated at the hinge.

FIG. 2 shows the same embodiment of the wall anchor (100) to that of FIG. 1, although with the elongate back portion (1) and the L-shaped portion (2) are shown separated at the hinge (7). Wall anchor (100) is formed by snap-fixing the two hinge portions together, as described further with reference to FIG. 3.

Figure 3:
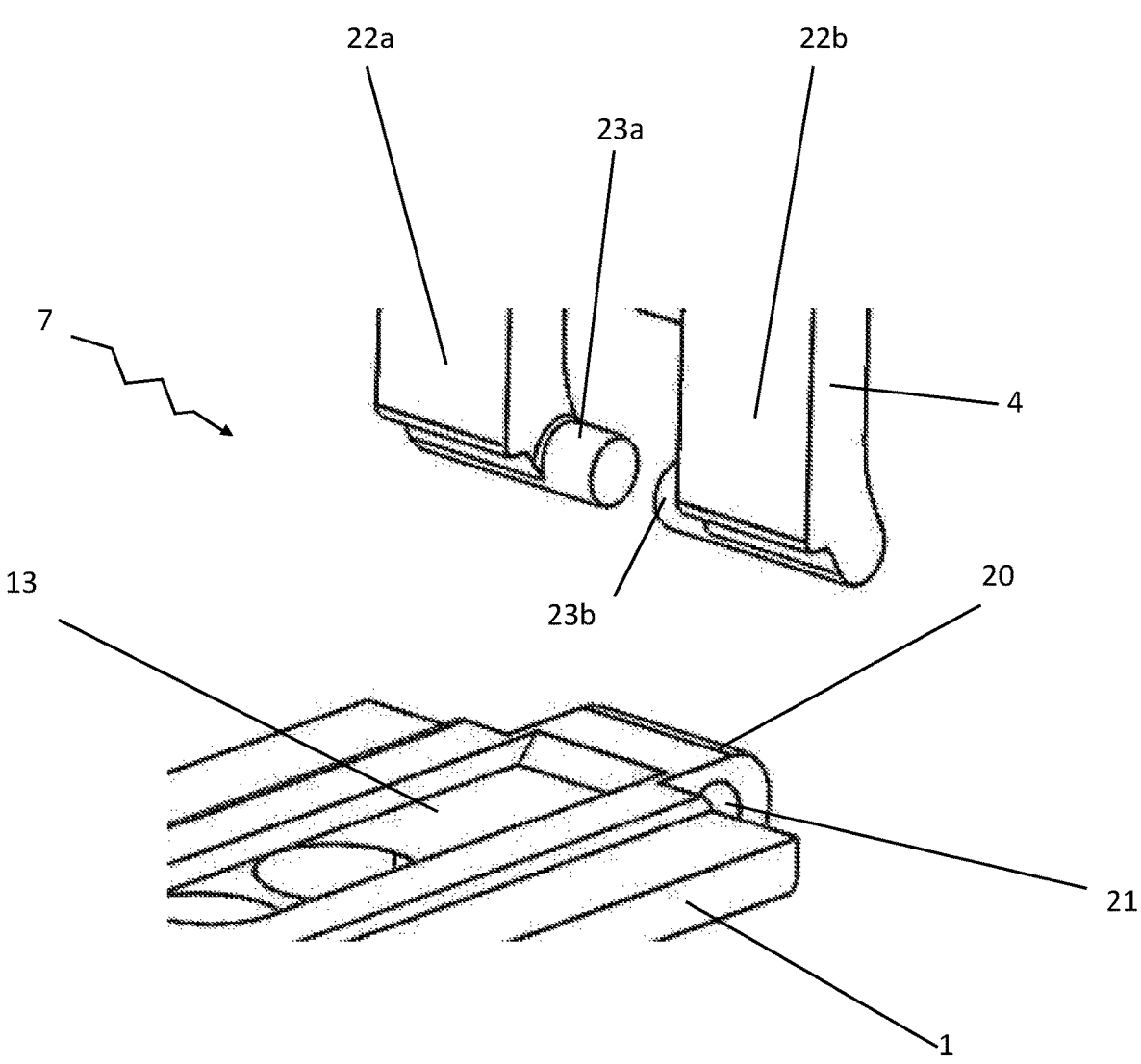
FIG. 3: shows the hinge in more detail.

FIG. 3 shows one embodiment of the hinge (7) as shown in FIG. 2 in more detail. In this embodiment, the hinge (7) is partially formed from a central arm (20) extending from back portion (1). Central arm (20) has an internal recess (21) at one side and a corresponding recess (not shown) at its other side. Second arm (4) divides into two separate legs (22a, 22b) separated from each other by a gap having a dimension which corresponds to the width of central arm (20). Each leg (22a, 22b) includes a tab (23a, 23b) which projects inwardly into the gap. Tabs (23a, 23b) are sized and shaped to form a snap fit with the corresponding recess (21) at each end of central arm (20). When snapped together, the tabs (23a, 23b) can rotate within recesses (21), thereby forming hinge (7). The arrangement of recesses and tabs can of course be reversed, such that the tabs are located on the central arm (20) of back portion (1) and the recesses formed in the legs (22a, 22b) of second arm (4).

Figure 4:
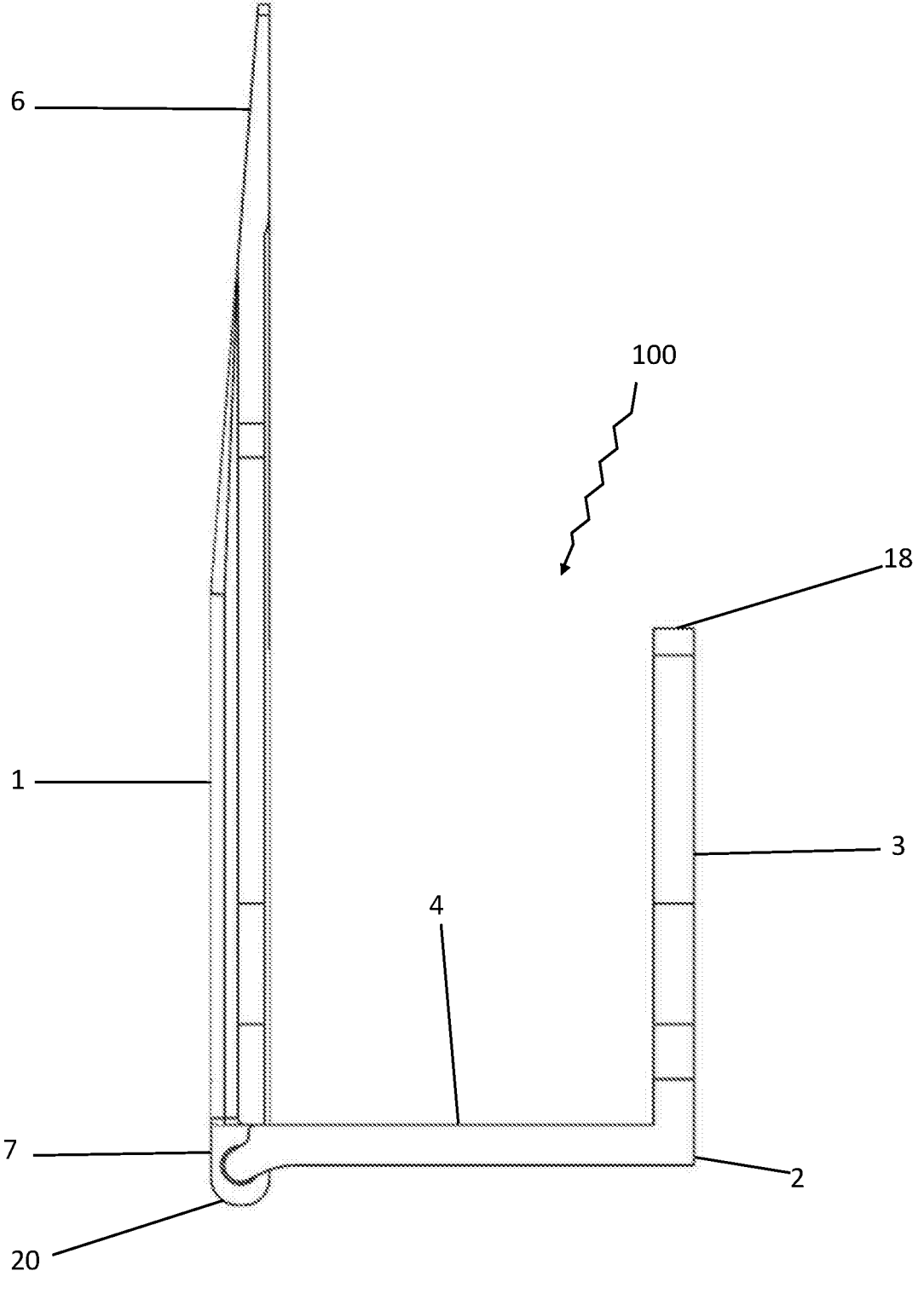
FIG. 4: shows a side view of the wall anchor of FIG. 1.

FIG. 4 shows the wall anchor (100) prior to deployment and viewed from the side. Again, the resilient member (9) is not shown for clarity. First arm (3) is substantially perpendicular to second arm (4) and forms L-shaped member (2). As illustrated, the back portion (1) is positioned to be substantially parallel with the first arm (3) and is substantially perpendicular to the second arm (4), so that the anchor (100) is in a first generally U-shaped configuration. The resilient member (9) (not shown) is responsible for maintaining the back portion (1) in this position. As shown, the elongate back portion (1) is longer than the first arm (3) and projects beyond the free end (18) of the first arm (3). The extended length of the back portion (1) provides a large area of contact to the inner surface of the hollow wall following deployment of the wall anchor (100).

The hinge (7) is configured to allow the L-shaped portion (2) to rotate relative to the back portion (1), until the second arm (4) of the L-shaped portion (2) is aligned to be continuous (aligned in the same plane) with the back portion (1). In this second configuration, when back portion (1) is continuous with second arm (4), the back portion (1) can be pushed through the wall (not shown) and the second arm (4) of the L-shaped portion (2) can also be driven into the wall after the back portion (1). The wall anchor (100) is pushed through the wall until the inner surface of the first arm (3) of the L-shaped portion (2) sits flush to the wall, on the external face of the wall.

Figure 5:
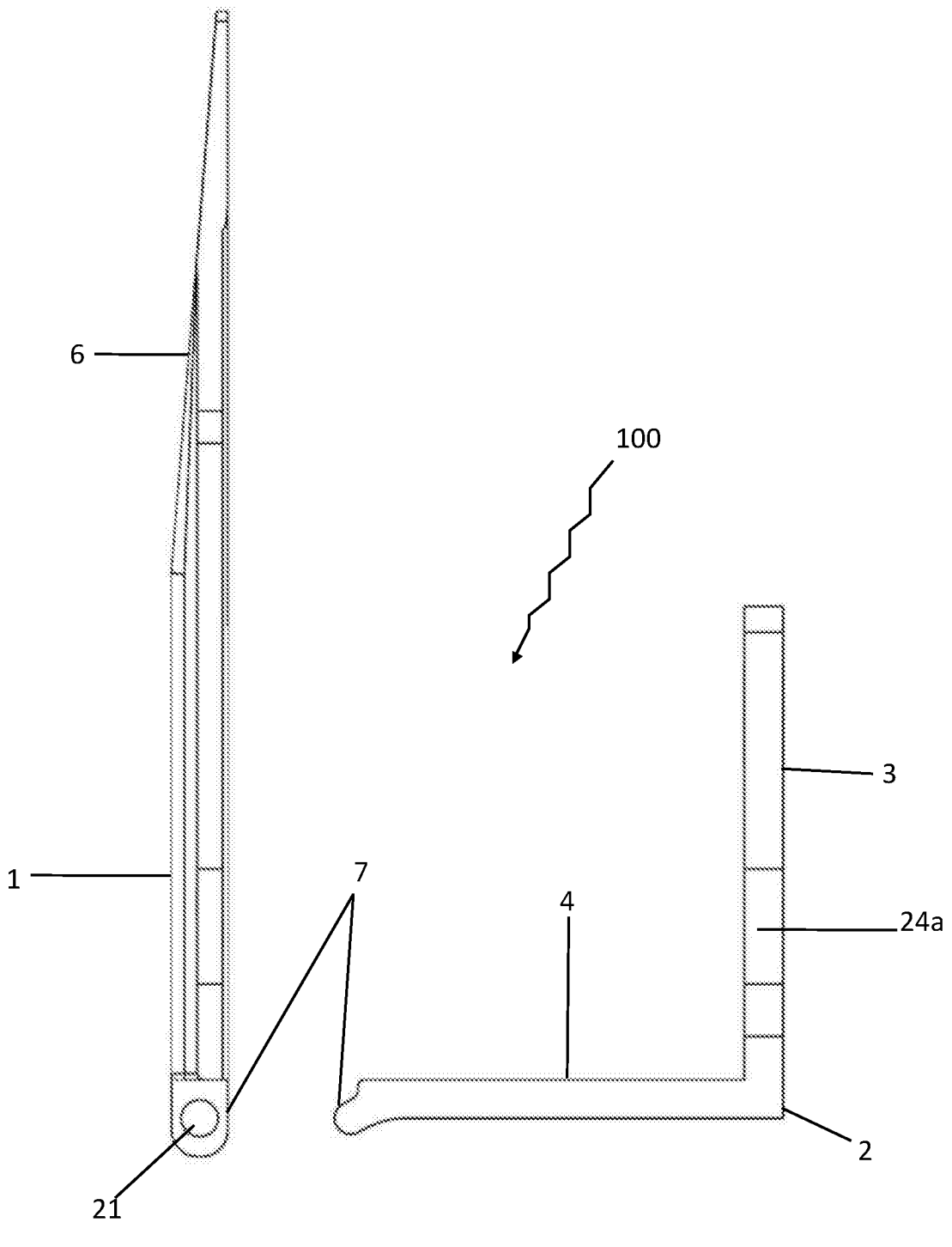
FIG. 5: shows a side view of the wall anchor of FIG. 1, with the elongate back portion and the L-shaped portion separated at the hinge.

FIG. 5 shows the embodiment of FIG. 4 with the L-shaped portion (2) and the back portion (1) are shown as separate pieces, separated at the hinge (7).

Figure 6:
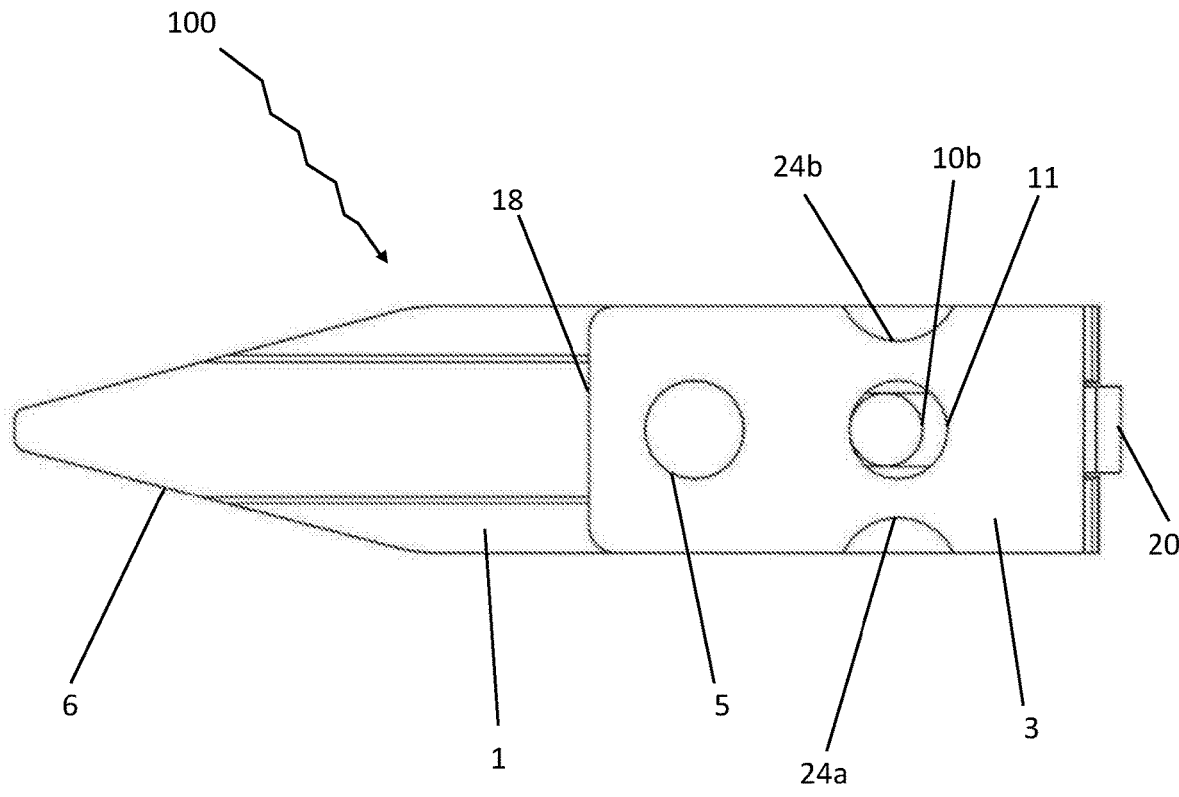
FIG. 6: shows a top view of the wall anchor of FIG. 1.

FIG. 6 shows the embodiment of FIG. 1, with anchor (100) prior to deployment, viewed from above. The resilient member (9) is not shown for clarity. As shown, the elongate back portion (1) is longer than the first arm (3) and projects beyond the free end (18) of the first arm (3). The extended length of the back portion (1) provides a large area of contact to the inner surface of the hollow wall following deployment of the wall anchor (100). Elongate back portion (1) terminates with a tapered and pointed region (6), which assists with penetration of the hollow wall during deployment.

In the embodiment shown in FIG. 6, first arm (3) of the L-shaped section (2) includes an aperture (5), which is located centrally within the width of arm (3) and towards its free end (18). Aperture (5) is exactly aligned with aperture (8) in the back portion (1), such that once the wall anchor (100) is fully deployed a screw or other holding means (not shown) can be positioned to pass through both apertures (5, 8), and to pull back portion (1) towards first arm (3) either side of the wall, thereby further securing the wall anchor (100) securely. Apertures (5, 8) may each be adapted for engagement with a screw, i.e., to include a helical thread corresponding to the helix of the screw to be used or to include a coating or insert which is adapted to be cut (tapped) by the thread of a screw.

First arm (3) of the L-shaped section (2) includes an aperture (11), which is located centrally within the width of arm (3) and towards its junction with second arm (4). Also illustrated is a corresponding aperture (10b) which is located in back portion (1). Apertures (11, 10b) are aligned such that once the resilient member (9) (not shown) is mounted on the anchor (100), via apertures (11, 10b), the resilient member exerts a force pulling back portion (1) and arm (3) inwardly, urging the anchor (100) to adopt the first, generally U-shaped configuration. In an alternative embodiment, apertures (11, 10b) could include an internally projecting lug which can be used to retain the resilient member. Alternatively, apertures (11, 10b) could be replaced with other means able to hold the resilient means onto the first arm (3) and back portion (1), respectively.

Figure 7:
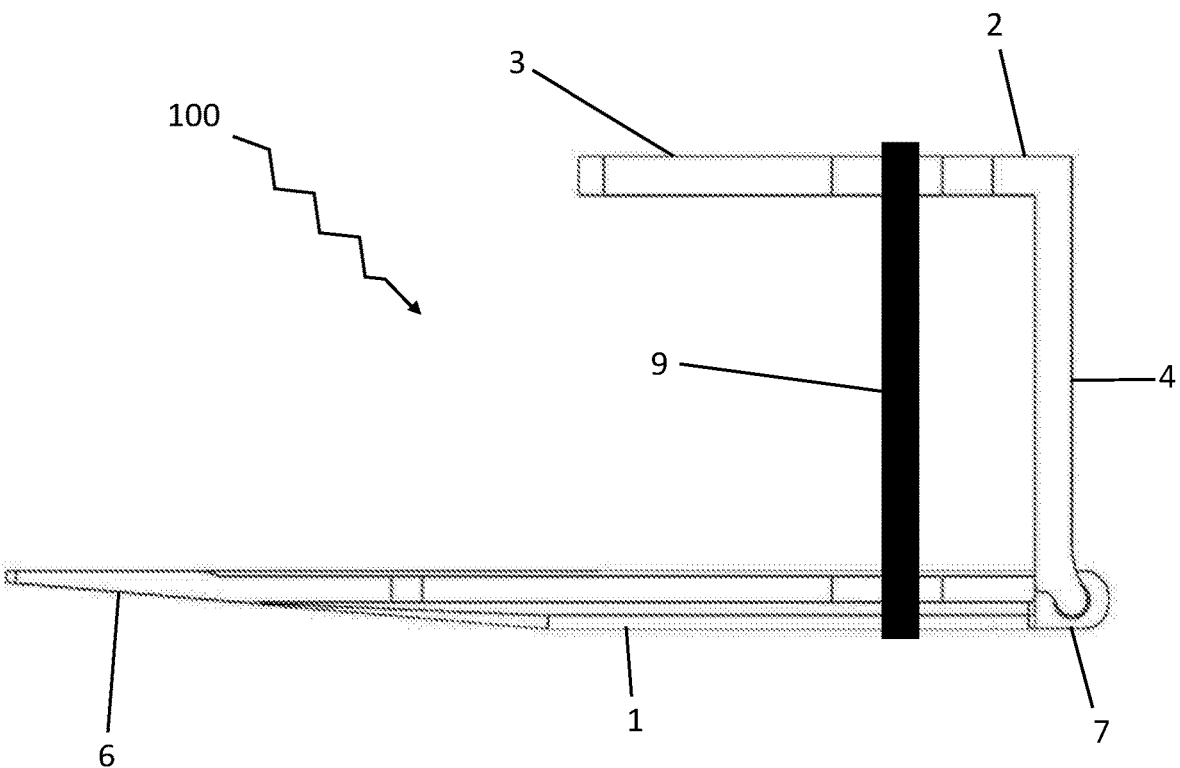
FIG. 7: shows a side view of an embodiment of the wall anchor according to the invention prior to deployment, with the resilient member attached.

FIG. 7 shows the wall anchor (100) of the embodiment shown in FIG. 1, prior to deployment, and with the resilient member (9) attached. Resilient member (9) urges the back portion (1) to adopt a position which is substantially perpendicular to the second arm (4) of the L-shaped portion (2), so that the anchor (100) is in a first, generally U-shaped configuration. The resilient member (9) is attached to the back portion (1) of the wall anchor (100) and is also attached to the first arm (3) of the L-shaped portion (2). Any appropriate attachment method is suitable. Optionally, in one embodiment, the resilient member is attached via apertures (10a, 10b) in back portion (1) and via aperture (11) and notches (24a, 24b) in arm (3). As describe in FIG. 1. Alternatively, a single aperture having an internally projection lug can be present in either or both of back portion (1) and first arm (3). The resilient member, usually in the form of a circle of resilient elastic material can then simply be looped over the lug and retained thereby.

Figure 8:
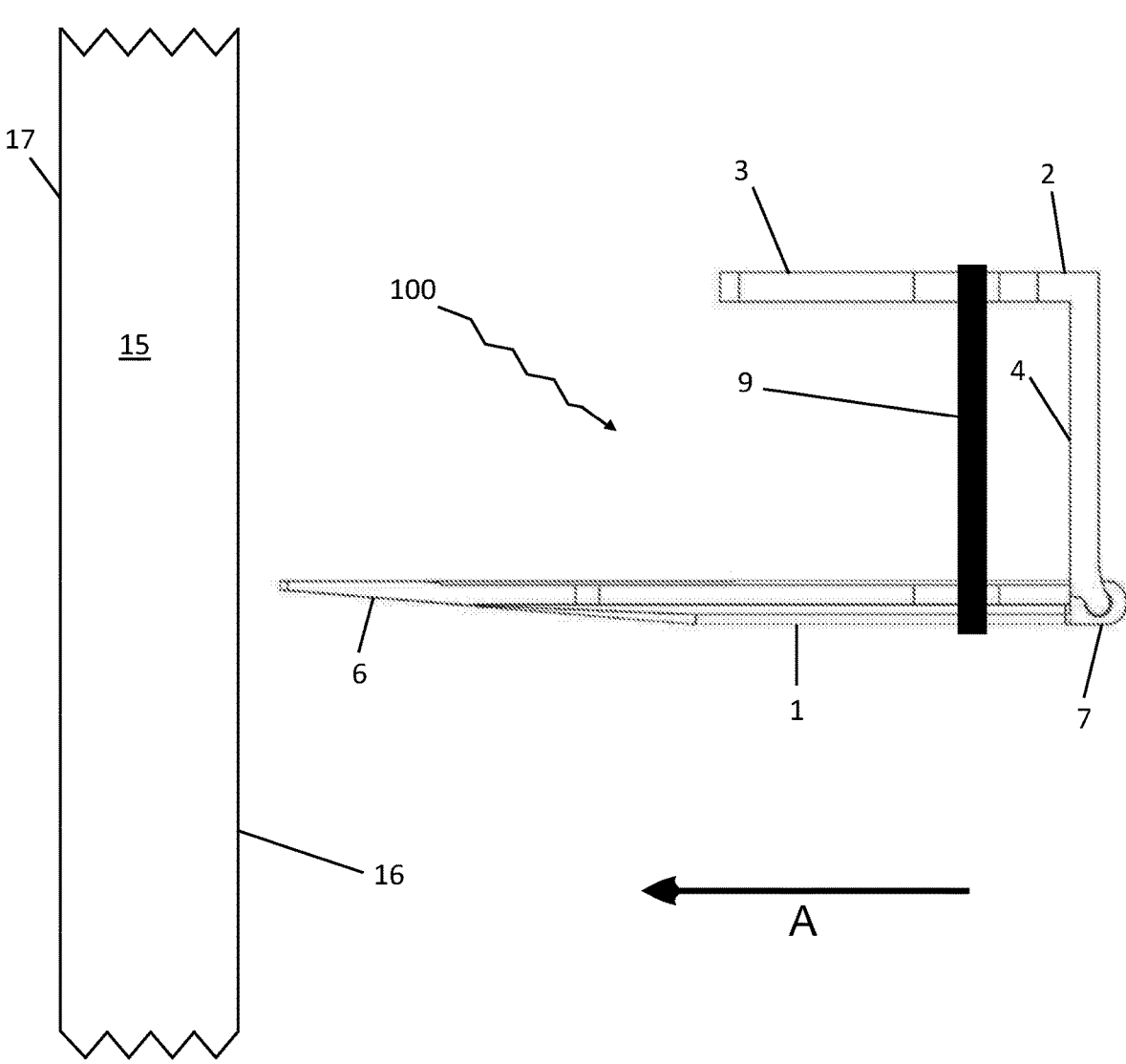
FIG. 8: shows the wall anchor of FIG. 6 immediately prior to deployment into a hollow wall.

FIG. 8 shows the embodiment of the anchor (100) as shown in FIG. 1 prior to deployment, with the resilient member (9) attached. The anchor (100) is ready for initial deployment into the wall (15), by driving pointed region (6) of back portion (1) into the front or external face (16) of wall (15) in the direction of arrow A. In a first method of deployment, the anchor (100) is retained within its first, generally U-shaped configuration whilst the pointed region (6) of back portion (1) is partially driven into the wall (15), before the back portion (1) is rotated at hinge (7) so that the anchor (100) is in its second configuration (shown in FIG. 10). In a second, alternative, method of deployment, the back portion (1) is first rotated at hinge (7) so that back portion (1) is contiguous with second arm (4) (i.e., the anchor (100) is placed into the second configuration at the start of deployment) before the back portion (1) is driven into wall (15). Rotation of the back portion (1) relative to arm (4) requires resilient member (9) to be stretched and placed under tension. In this alternative method of deployment, anchor (100) needs to be held in this second configuration until the second arm (4) is located within the wall (15).

Figure 9:
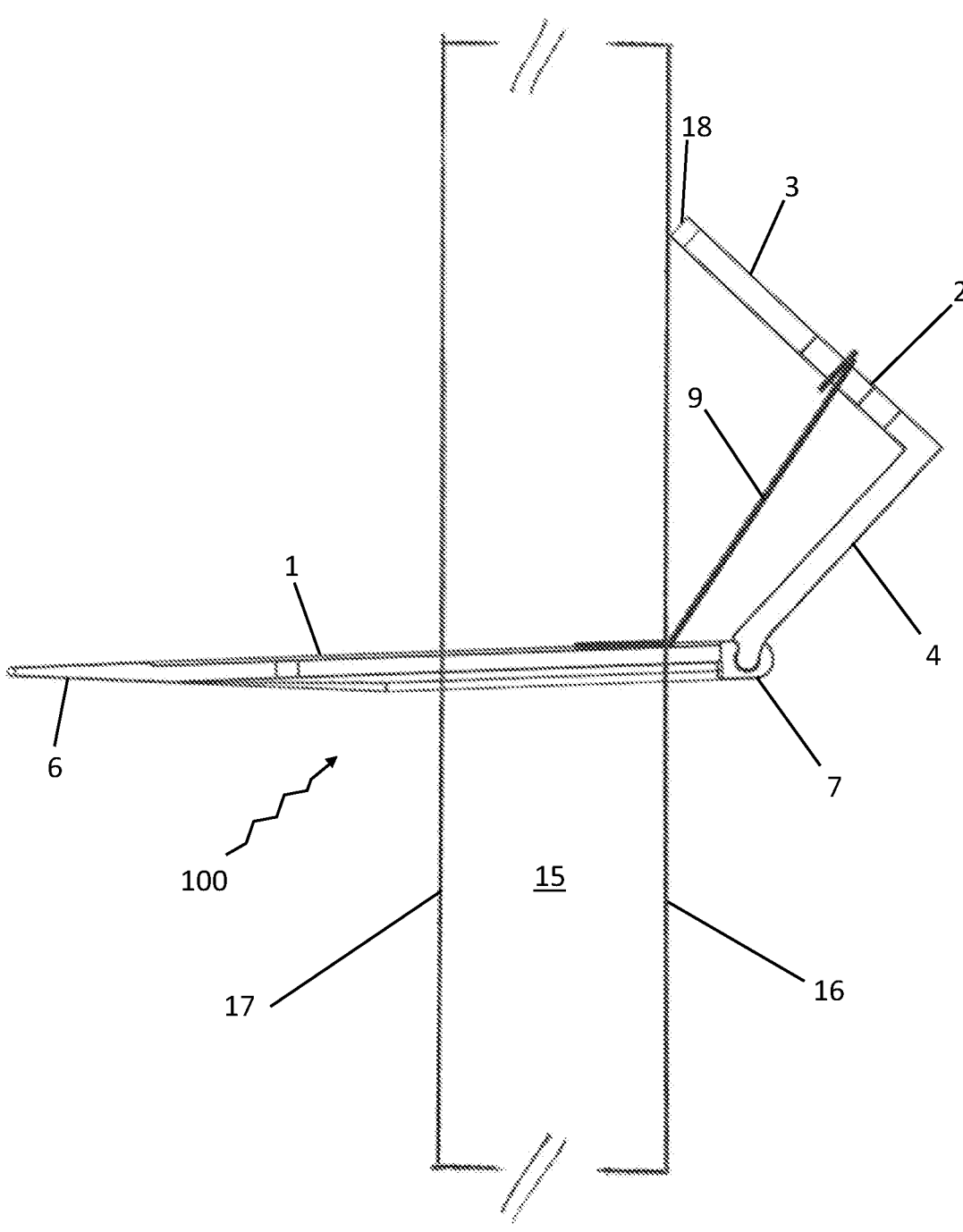
FIG. 9: shows a cross-section of a hollow wall and an embodiment of the wall anchor during deployment.

FIG. 9 shows the anchor (100) during an initial stage of deployment according to the first method of deployment described above. The pointed region (6) of back portion (1) has been driven through the wall (15), so that it projects into the space behind the wall (15), adjacent back or internal face (17). The L-shaped portion (2) is partially rotated at the hinge (7) relative to back portion (1) such that the angle between second arm (4) and back portion (1) is greater than 90°, and causes the free end (18) of first arm (3) to be rotated away from the front or external surface (16) of wall (15). Resilient member (9) is partially stretched and under tension. With further rotation of the L-shaped portion (2), anchor (100) can then be driven through the hole formed in wall (15) by pointed region (6), so that anchor (100) moves further into the wall (15) such that the first arm (3) lies flush with the external surface (16) of the wall (15) and arm (4) spans the width of wall (15), the back portion (1) extends beyond the back or internal face (17) of wall (15).

Figure 10:
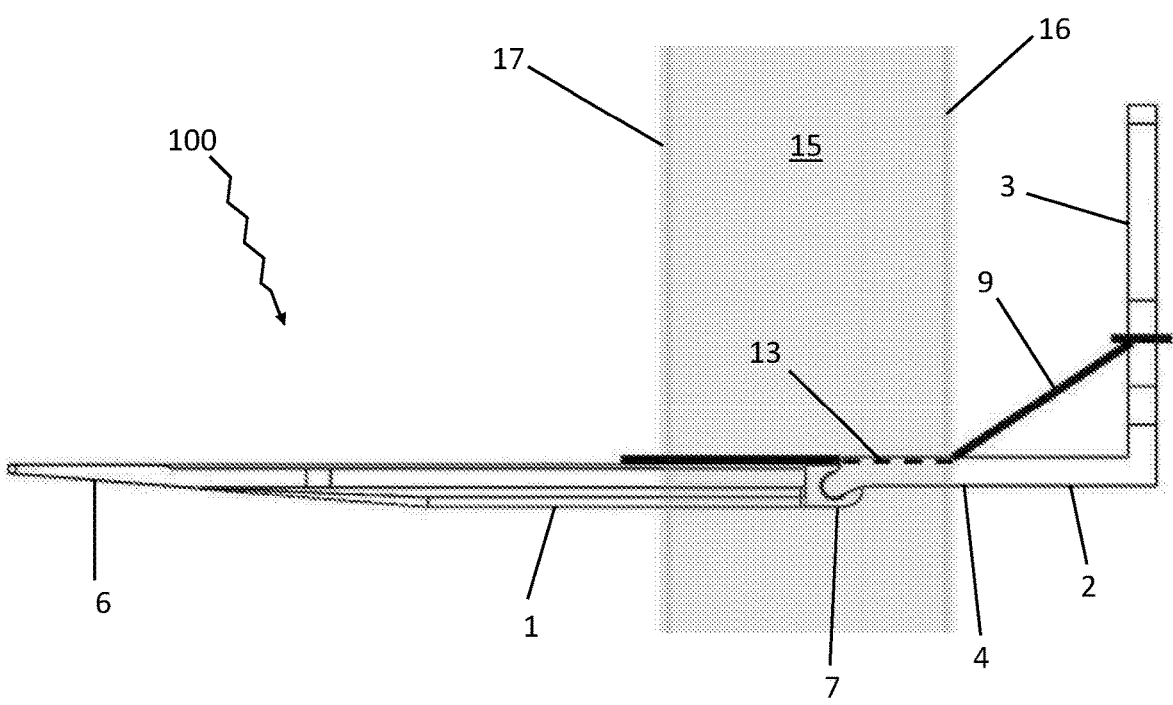
FIG. 10: shows a cross-section of a hollow wall and the wall anchor of FIG. 8 during a later stage of deployment.

FIG. 10 shows the anchor (100) during a later stage of deployment. At this stage, the elongate back portion (1) have been passed partially through wall (15), and the second arm (4) has been passed partially through wall (15). To finish deployment, the wall anchor (100) is driven further into the wall (15) such that the first arm (3) lies flush with the external surface (16) of the wall (15) and arm (4) spans the width of wall (15), so that hinge (7) is located in the space behind the wall (15), i.e., has cleared internal surface (17) of wall (15). Once the anchor (100) reaches this position, resilient member (9) will force elongate back portion (1) to rotate at hinge (7) and therefore lie flush with the internal (back) surface (17) of the wall (15), whilst arm (3) lies flush with the external (front) surface (16) of wall (15).

As shown in FIG. 10, the resilient member (9) is partially situated in recess (13, not shown) of elongate back portion (1). The portion of resilient member (9) located in recess (13) is represented in FIG. 10 by a dashed line. It can be seen that having recesses (13, 14)) sized to contain the resilient member (9) in the internal surfaces of the back portion (1) and the second arm (4) reduces the chance of the resilient member (9) snagging on the edges of hole formed in wall (15) during deployment.

Figure 11:
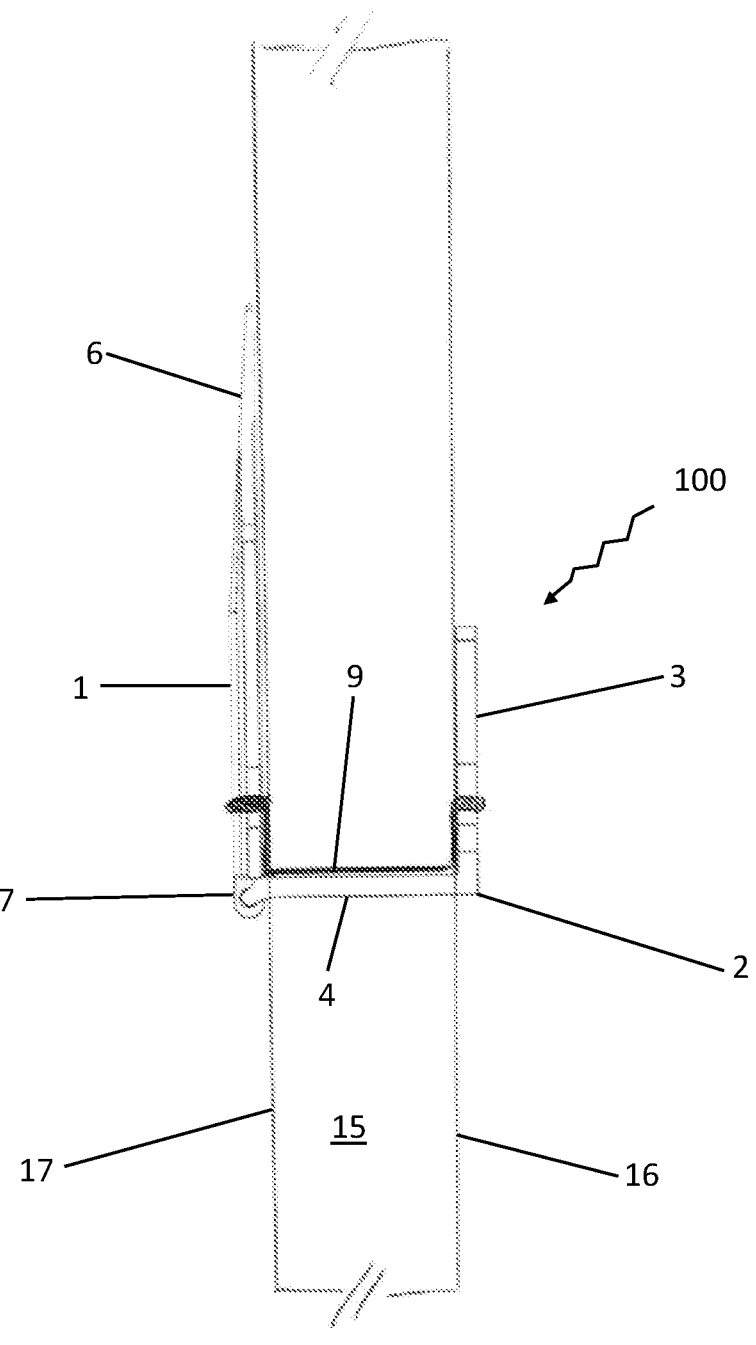
FIG. 11: shows a cross-section of a hollow wall and an embodiment of the wall anchor according to the invention when deployed in the wall.

FIG. 11 shows the anchor (100) deployed in a hollow wall (15). The resilient member (9) is illustrated. Once fully deployed the back portion (1) is rotated to sit flush with the internal (back) surface (17) of the wall (15). This rotation of back portion (1) occurs once hinge (7) has passed through wall (15) as the resilient member (9) urges the back portion (1) to become substantially perpendicular to the second arm (4) of the L-shaped portion (2). Since the second arm (4) of the L-shaped portion (2) is held in position due to its position spanning across the width of the wall (15), the back portion (1) is forced to rotate to sit flush against the internal surface (17) of the wall (15) as shown. As shown the fastening means is still to be inserted through apertures (5, 8) (not shown in FIG. 11) to complete fixation of the wall anchor (100). FIG. 11 shows the position of the resilient member (9) when the anchor (100) is deployed. It can be seen that the resilient member (9) sits between the wall (15) and the internal face of the second arm (4) of the L-shaped portion (2).

From the position of the resilient member 9 after deployment (see FIG. 11), it is advantageous that the internal face of the second arm (4) of the L-shaped portion (2) has a recess (14), best seen in FIG. 1, in which the resilient member (9) can be located when the anchor (100) is deployed in the wall (15). Even more advantageously, the internal face of the back portion (1) can also include a recess (13) which forms an extension of recess (14). Optionally, the first arm (3) of the L-shaped portion (2) can further include a recess (not shown), which forms a further extension of recess (14). The resilient member (9) can be partially or completely located within one or more of these recesses (13,14) when the anchor (100) is being deployed (see FIGS. 9 and 10), and after deployment, best seen in FIG. 11. Positioning of the partially tensioned resilient member (9) within the recesses (13, 14) occurs during tensioning of the resilient member (9) and has the advantage that the resilient member (9) will not snag on edges of the hole formed in the wall (15) during the deployment of the anchor (100).

Figure 12:
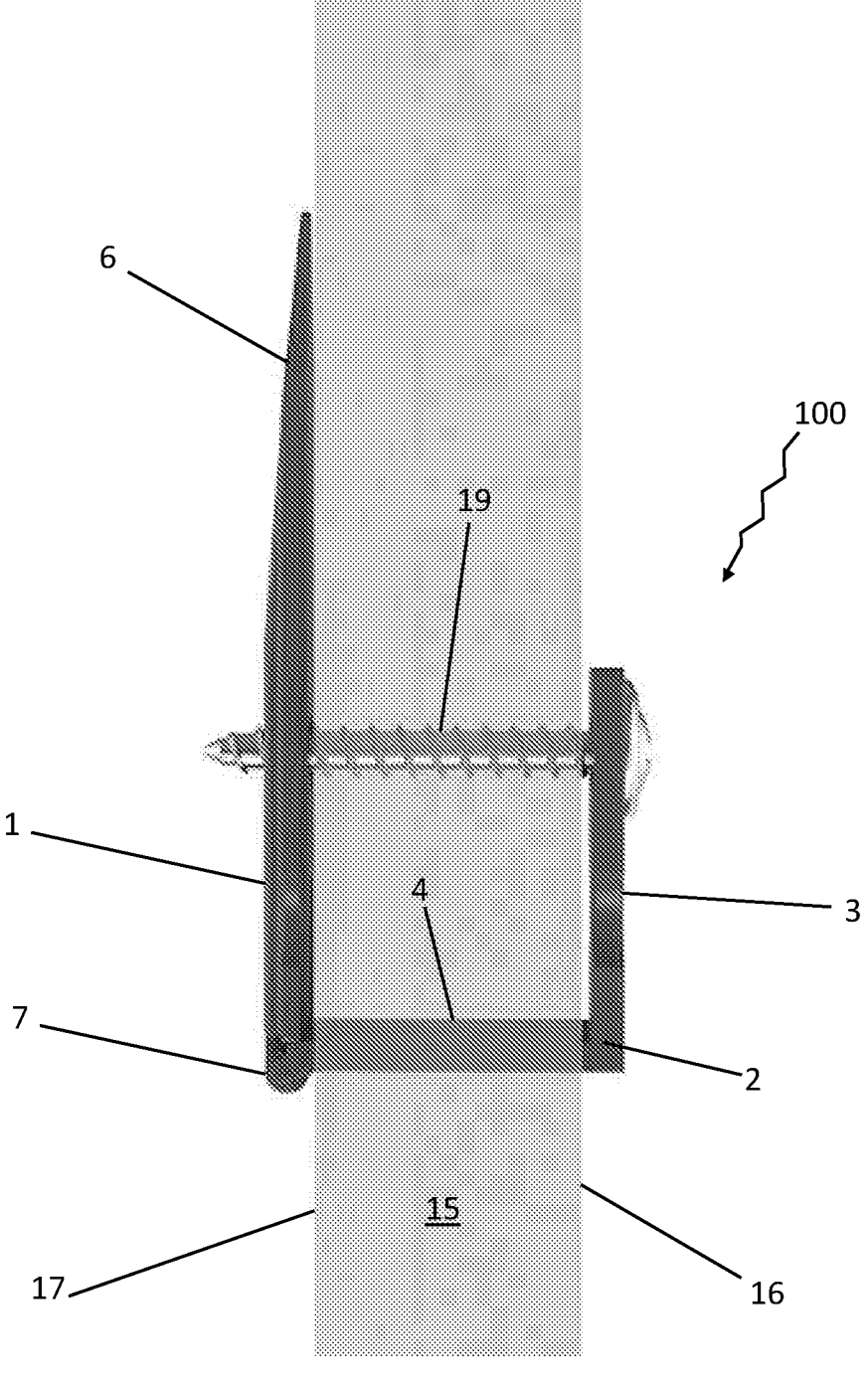
FIG. 12: shows an embodiment of the wall anchor according to the invention in the position adopted following deployment in a hollow wall, with a screw as a holding means.

FIG. 12 shows the anchor (100) in the position adopted when deployed in a wall (15). The resilient member (9) is not illustrated, for clarity. Once fully deployed the back portion (1) is rotated to be substantially parallel to first arm (3). In this position the back portion (1) will be located against the internal surface (17) of the wall (15). This rotation occurs once hinge (7) has passed through wall (15) so that the resilient member (9) can urge the back portion (1) to become substantially perpendicular to the second arm (4) of the L-shaped portion (2). Given that the second arm (4) of the L-shaped portion (2) is held in position due to its position against the front surface (16) of the wall (15), the back portion (1) is forced to rotate to sit flush against the internal surface (17) of the wall (15).

FIG. 12 also shows the fastening means (19) now located to complete fixation of the anchor (100). As illustrated, in this embodiment, the fastening means is a screw (19) which is located through the two aligning apertures (5, 8), in the back portion (1) and first arm (3) of the L-shaped portion (2). The screw (19) creates its own aperture through wall (15)

during its insertion. As the fastening means (19) has been inserted through apertures (5, 8) the fastening means (19) also urges back portion (1) tight against the internal surface (17) of the wall (15) and holds the anchor firmly on wall (15). Optionally other desired fittings (e.g., hooks, eyelets, brackets or the like), not shown, can be positioned between fastening means (19) and arm (3).

Figure 13:
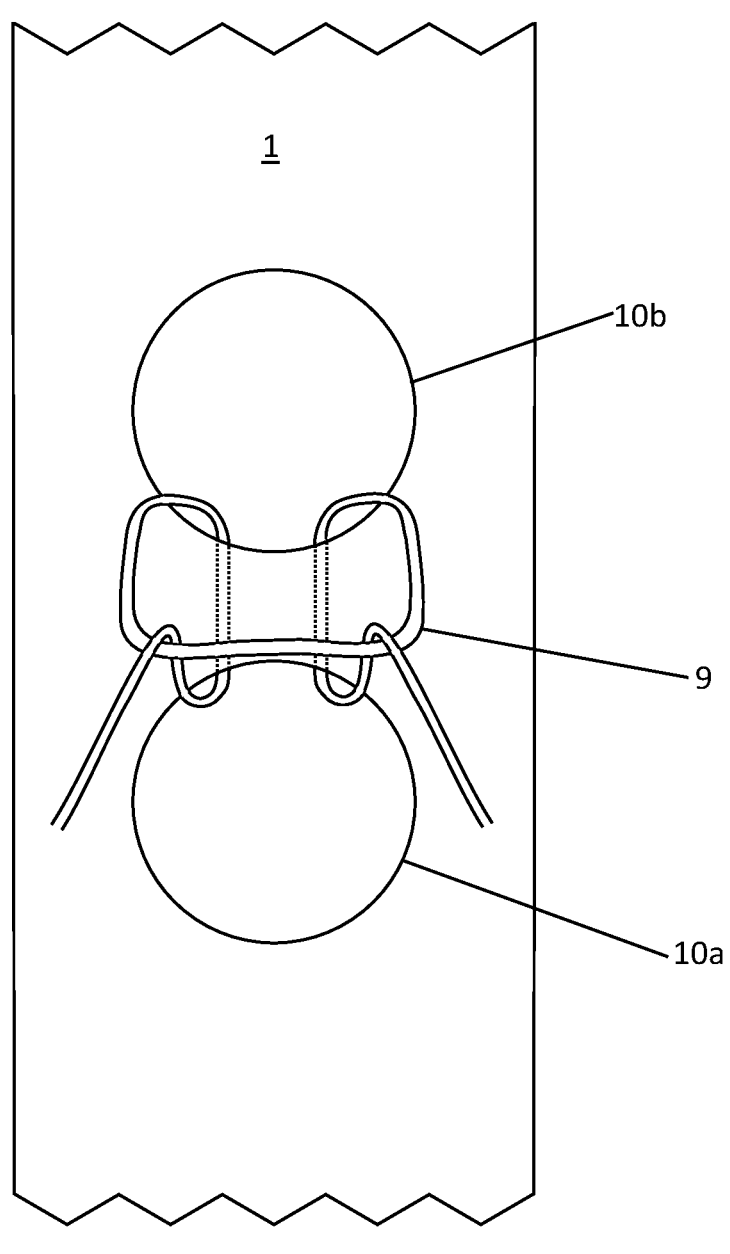
FIG. 13: shows one possible arrangement for attachment of the resilient member to the back portion of the wall anchor.

FIG. 13 shows one possible arrangement for attaching the resilient member (9) to the back portion (1) of the anchor. In this embodiment, the resilient member (9) is formed of an elastomeric material and is in the form of a loop, for example is an elastic band or similar. The internal face of back portion (1) is shown. The end of the loop has been passed from the middle of the anchor (i.e., from the space formed between the back portion (1) and the first arm (3)) through aperture 10a and then through aperture 10b. At this intermediate stage, both ends of the loop are located in the middle of the anchor (i.e., in the space formed between the back portion (1) and the first arm (3)). As shown the end of the loop protruding from aperture (10a) has been passed through the loop protruding from aperture 10b. The converse is also possible. In this way, the resilient member is attached to back portion (1) as it has been looped back over itself. Only part of the resilient member (9) is shown, for clarity.

Figure 14:
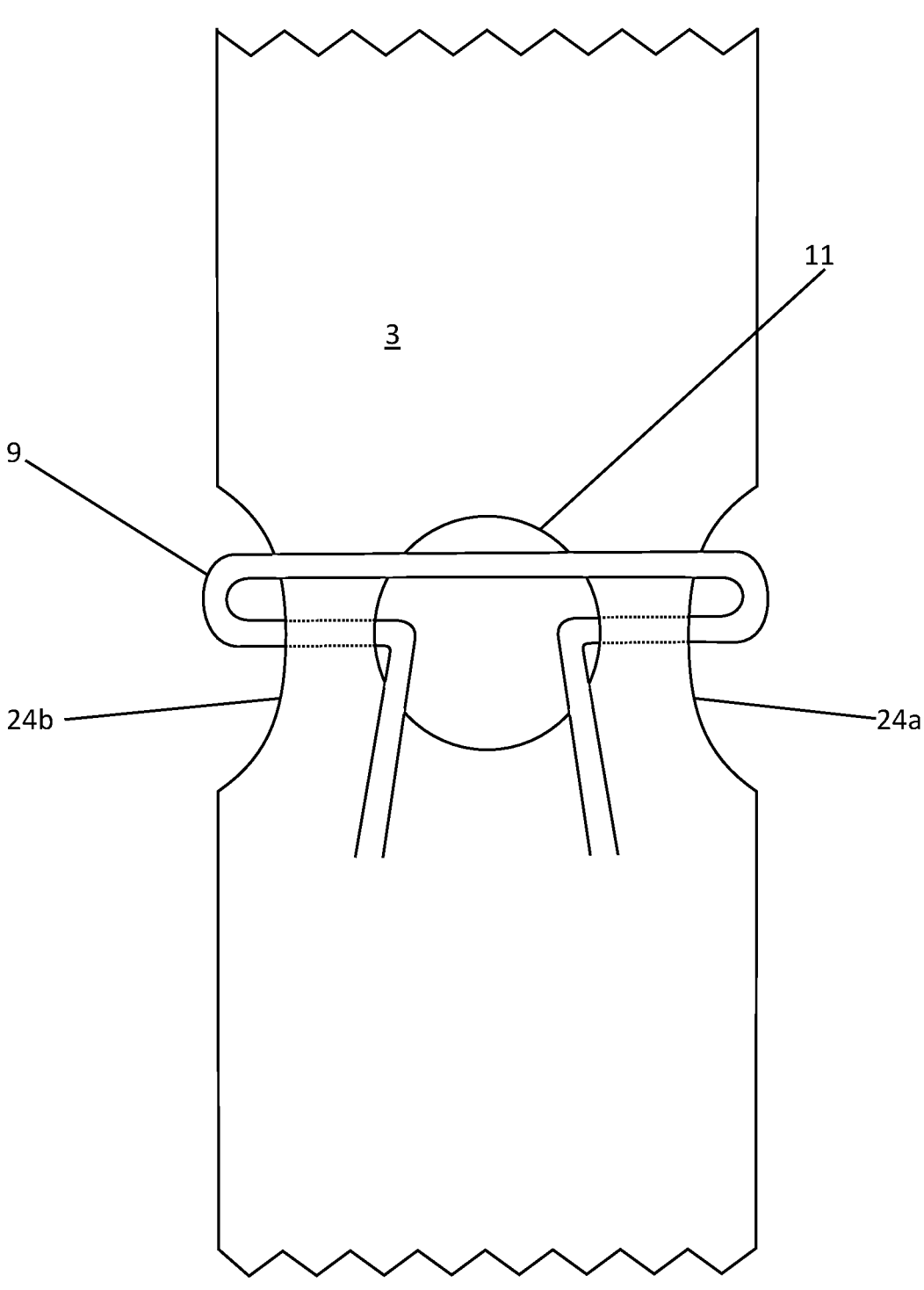
FIG. 14: shows one possible arrangement for the attachment of the resilient member to the L-shaped member of the wall anchor.

FIG. 14 shows one possible arrangement for attaching the resilient member (9) to the first arm (3) of the anchor (partially shown in this figure). In this embodiment, the resilient member (9) is formed of an elastomeric material and is in the form of a loop, for example is an elastic band or similar. Optionally, the resilient member (9) has already been attached to the back portion (1), for example as described above for FIG. 13. The internal face of first arm (3) is shown. The free end of the loop of resilient member (9) has been passed from the middle of the anchor (i.e., from the space formed between the back portion (1) and the first arm (3)) through its aperture (11). The resilient member (9) is then stretched over the free end (18) of first arm (3) and located snugly onto the retaining notches (24a, 24b). In this way, the resilient member (9) is attached to first arm (3). Only part of the resilient member (9) is shown, for clarity.

Other alternative ways of attaching the resilient member (9) are also possible. For example, the resilient member (9) can be linear and can comprise end stoppers which prevent each end from being pulled through apertures in the back portion (1) and first arm (3). Alternatively, the back portion (1) and/or first arm (3) can include a catch, clip or other means to firmly the resilient member.

Figure 15:
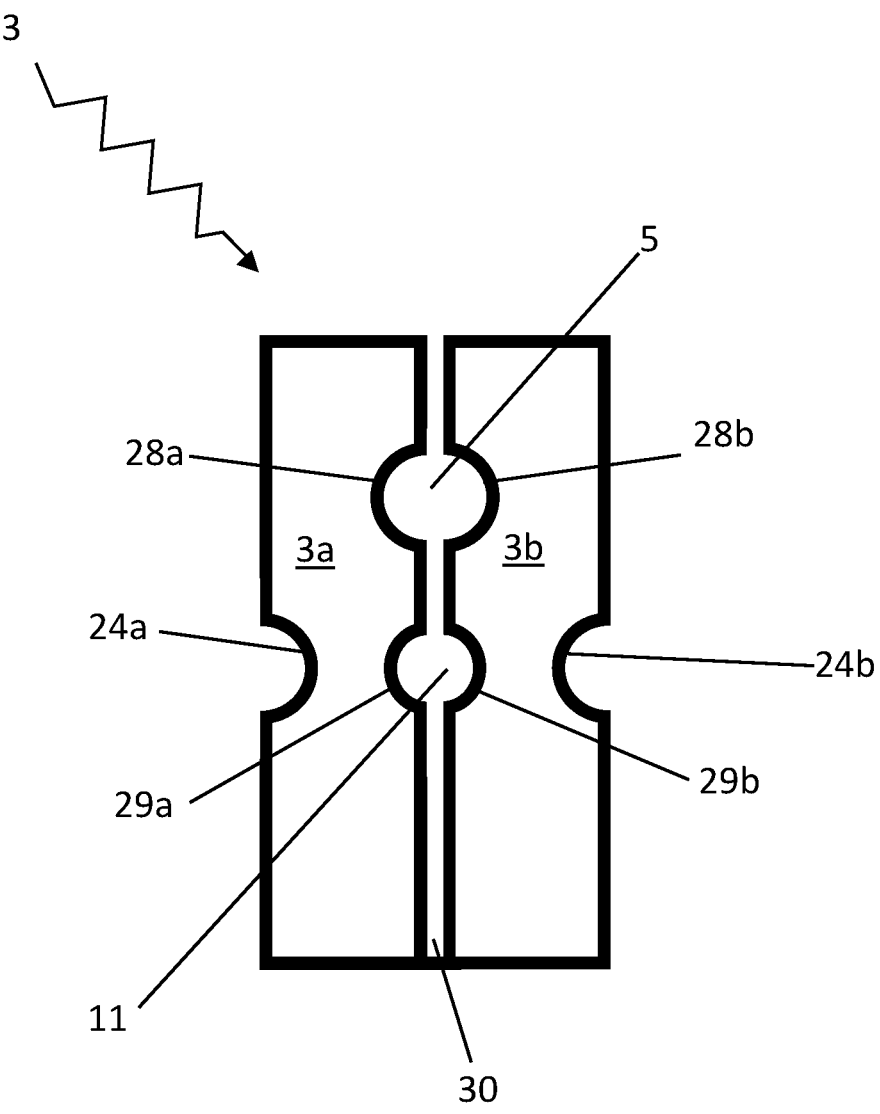
FIG. 15 shows an alternative embodiment for first arm of the wall anchor of the invention, viewed in plan form.

FIG. 15 shows an alternative embodiment for first arm (3) of the wall anchor (100) viewed in plan form. In this embodiment, the first arm (3) is formed from two sections (3a, 3b) which are separated by a gap (30) therebetween. Each section (3a, 3b) extends essentially perpendicularly from second arm (4) and together with second arm (4) forms the L-shaped member (2). As shown in FIG. 15, aperture (5) for the holding means (19) is formed partially by a concave edge portion (28a, 28b) in each of sections (3a, 3b) in combination with the width of the gap (30) therebetween. Likewise, aperture (11) for retaining the resilient member (9) is formed by a combination of a concave edge portion (29a, 29b) in each of sections (3a, 3b) in combination with the width of the gap (30) therebetween. Using this alternative arrangement for first arm (3), enables sections (3a, 3b) to be removed once the wall anchor has been fully deployed and the holding means tightened. Once the holding means (19) has been tightened such that the back portion has been fixedly attached onto the internal (back) face (17) of wall (15), first arm (3) is essentially redundant for holding the wall anchor in place. Accordingly, sections 3*a*, 3*b* can simply be "snapped off" or otherwise removed from the wall anchor (100) and, if required, the holding means can then be tightened further. Optionally, the junction between second arm (4) and each of sections (3*a*, 3*b*) can include an area which facilitates the removal of sections (3*a*, 3*b*), for example can include perforations or a scored area or the like. Once sections (3*a*, 3*b*) are removed, the resilient member (9) can be removed or can be located on the internal (back) section (17) of the wall (15) where it is out of sight.

Figure 16:
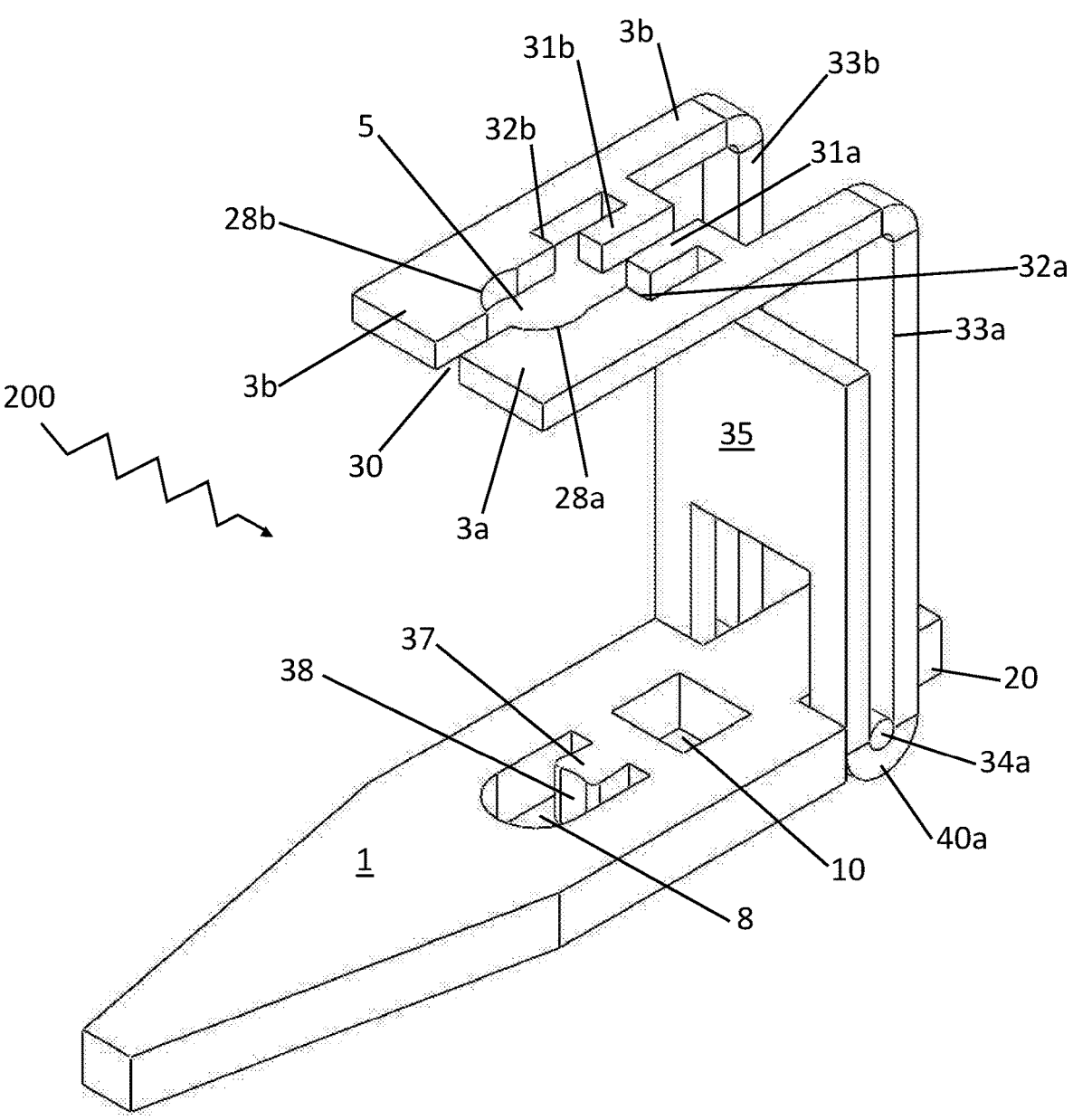
FIG. 16 shows an alternative embodiment of the wall anchor according to the invention.

FIG. 16 shows an alternative embodiment for the wall anchor (200) in which the first arm (3) of the L-shaped member (2) is also formed from two sections (3*a*, 3*b*) which are separated by a gap (30) therebetween. As shown in FIG. 16, aperture (5) for the holding means is formed partially by a concave edge portion (28*a*, 28*b*) in each of sections (3*a*, 3*b*) in combination with the width of the gap (30) therebetween. In contrast to the embodiment shown in FIG. 15, the means for retaining the resilient member is formed by two lugs (31*a*, 31*b*) which extend substantially parallel to first arm sections (3*a*, 3*b*). In this embodiment, the resilient member (not shown) can be located and held in place by the lug(s) (31*a*, 31*b*). As illustrated, the first arm sections (3*a*, 3*b*) have a narrower profile in the location of lugs (31*a*, 31*b*), with a step (32*a*, 32*b*) in the profile of first arm sections (3*a*, 3*b*) acting as a stopper to prevent the resilient member from sliding off the lugs (31*a*, 31*b*) during use.

Using this alternative arrangement for first arm (3), enables sections (3*a*, 3*b*) to be removed once the wall anchor (200) has been fully deployed and the holding means (not shown) tightened. Once the holding means has been tightened such that the back portion (1) has been fixedly attached onto the internal (back) face (17) of wall (15), first arm (3) is essentially redundant for holding the wall anchor (200) in place. Accordingly, sections 3*a*, 3*b* can simply be "snapped off" or otherwise removed from the wall anchor (200) and, if required, the holding means (19, not shown) can then be tightened further In this embodiment, second arm (4) is formed from two struts (33*a*, 33*b*) which extend perpendicularly from first arm sections (3*a*, 3*b*) to form an L-shape. As illustrated, struts (33*a*, 33*b*) extend towards the back portion (1) to which it is hingedly attached. In this embodiment, the hinge (7) is formed by struts (33*a*, 33*b*) curving around tabs (34*a*, 34*b*) which project outwardly from central arm (20) which extends from back portion (1). As shown, struts (33*a*, 33*b*) curve 180° to form a curved portions (40*a*, 40*b*) located around the tabs (34*a*, 34*b*) in a manner which allows rotation between the L-shaped member (2) and the back portion (1). Curved portions (40*a*, 40*b*) are fixedly attached or integral to a plate (35) which extends away from back portion (1) in a generally perpendicular manner and generally parallel to struts (33*a*, 33*b*). Plate (35) extends towards first arm sections (3*a*, 3*b*), and in this embodiment is shorter than struts (33*a*, 33*b*).

Elongate back portion (1) also includes an aperture (10) for attachment of a resilient member (9), not shown in FIG. 16. One end of a closed loop resilient member (9) (not shown), which could conveniently be an elastic band, can be passed through aperture 10 and then located onto an internally projecting lug (37) in aperture (8). As shown, aperture (8) includes an internally projecting lug (37), which has an increased width at its free end (38) which acts as a stopper to prevent resilient member (9, not shown) from being released during deployment of the wall anchor (200). Other alternative shapes for lug (37) are also possible. Additionally, lug (37) could alternatively be located in aperture (10).

Aperture (8) within elongate back portion (1) is also sized and shaped to accommodate a holding means for wall anchor (200). Thus aperture (8) is aligned with aperture (5) in first arm (3), such that once the wall anchor (200) is fully deployed, a screw or other holding means (not shown) can be positioned to pass through both apertures (5, 8), and to pull back portion (1) towards first arm (3) inwardly together on either side of the wall, thereby further securing the wall anchor (200) securely. Apertures (5, 8) may each be adapted for engagement with a screw, i.e., to include a helical thread corresponding to the helix of the screw to be used or to include a coating or insert which is adapted to be cut (tapped) by the thread of a screw as the screw is rotated.

Figure 17:
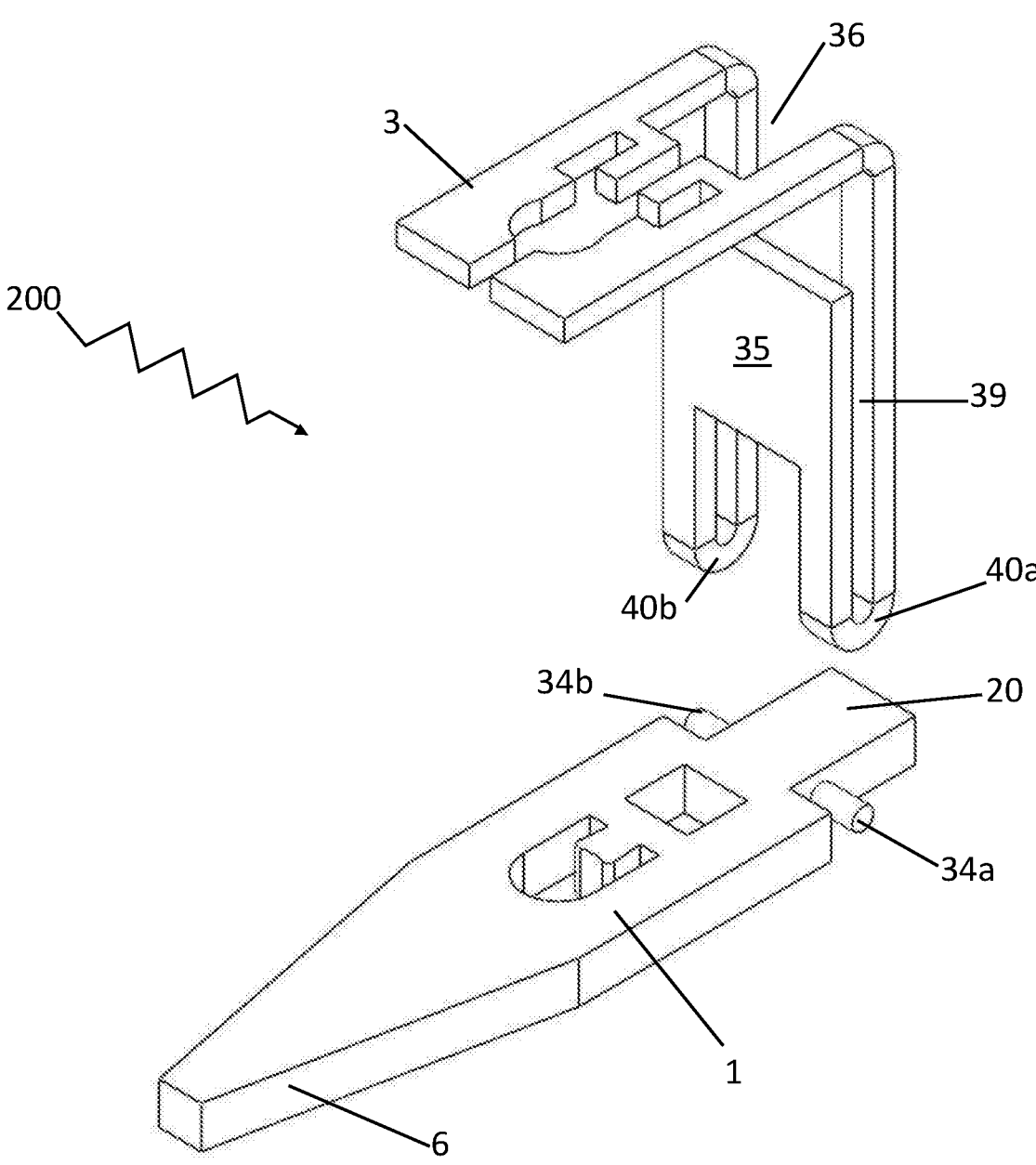
FIG. 17 shows the embodiment of FIG. 16 with the L-shaped member separated from the back portion.

FIG. 17 shows the embodiment of FIG. 16 with the L-shaped member (2) shown separated from the back portion (1). These two pieces are combined together to form the wall anchor (200). The pieces can be attached by bringing the back portion (1) alongside the inner surface of first arm (3) and sliding the back portion (1) along the inner surface of first arm (3) and towards second arm (4). The tabs (34*a*, 34*b*) can be located against struts (33*a*, 33*b*) at the intersection with first arm (3) and then the tabs (34*a*, 34*b*) slid into the gap (39) between struts (33*a*, 33*b*) and plate (35), before being located against the curved portions (40*a*, 40*b*) of struts (33*a*, 33*b*) to form the hinge (7).

Figure 18:
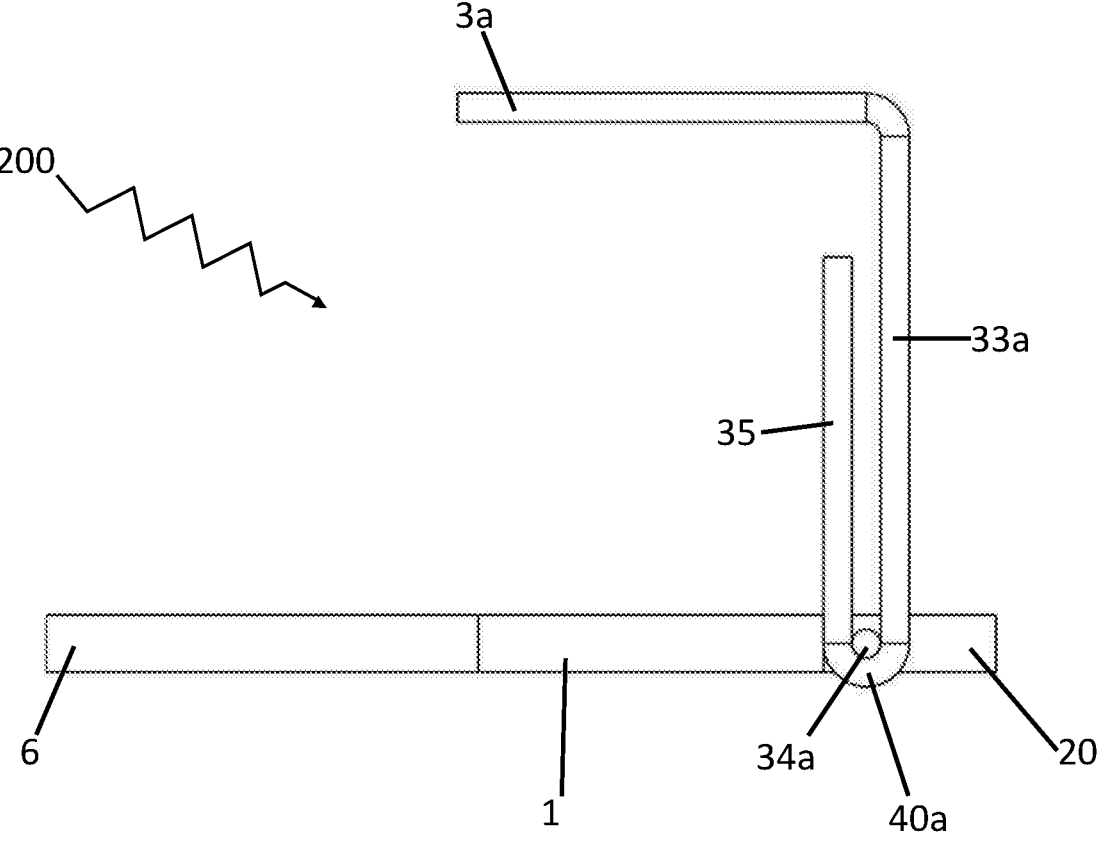
FIG. 18 shows the embodiment of FIGS. 16 and 17 when viewed from the side, with the L-shaped member (2) attached to the back portion (1).

FIG. 18 shows the embodiment of FIGS. 16 and 17 when viewed from the side with the L-shaped member (2) attached to the back portion (1).

All documents referred to herein are incorporated by reference. Any modifications and/or variations to described embodiments that would be apparent to one of skill in art are hereby encompassed. Whilst the invention has been described herein with reference to certain specific embodiments and examples, it should be understood that the invention is not intended to be unduly limited to these specific embodiments or examples.

The invention claimed is:

1. A wall anchor for fixing to a hollow wall, wherein said anchor comprises an L-shaped portion with a first arm and a second arm, wherein the first and second arms are held in a fixed arrangement substantially perpendicular to each other, a hinge which connects the second arm of said L-shaped portion to an elongate back portion adapted to engage an inner surface of the wall, and a resilient member which urges the elongate back portion to rotate around the hinge to adopt a substantially perpendicular position relative to the second arm of the L-shaped portion, wherein said resilient member is attached to the elongate back portion and to the first arm of the L-shaped member.

2. The wall anchor as claimed in claim 1, wherein said elongate back portion comprises a pointed region.

3. The wall anchor as claimed in claim 1, wherein said elongate back portion and the first arm of said L-shaped portion contain apertures for receiving a holding means, and wherein said apertures are aligned when said elongate back portion and the first arm of said L-shaped portion are parallel.

4. The wall anchor as claimed in claim 3, wherein an internal surface of one or more of said apertures is adapted for engagement with a screw.

5. The wall anchor as claimed in claim 1, wherein the resilient member is formed from an elastics material.

6. The wall anchor as claimed in claim 1, wherein the resilient member is in the form of a loop.

7. The wall anchor as claimed in claim 1, wherein the said elongate back portion and the first arm of said L-shaped portion contain at least one aperture for attachment of the resilient member.

8. The wall anchor as claimed in claim 7, wherein said at least one aperture for attachment of the resilient member includes an internal lug to hold said resilient member.

9. The wall anchor as claimed in claim 1, wherein the said elongate back portion and/or said L-shaped portion have a recess sized to contain the resilient member on an internal surface thereof.

10. The wall anchor as claimed in claim 1, wherein said first arm is formed from two struts with a gap therebetween.

11. The wall anchor as claimed in claim 1, wherein the first arm of the L-shaped portion is adapted to be removed after deployment of the wall anchor.

12. A method of attaching a wall anchor to a hollow wall, said method comprising forcing an elongate back portion of the anchor as claimed in claim 1 into said wall, rotating the L-shaped portion so that the second arm of the L-shaped portion forms a continuation of said back portion, further forcing said second arm of the L-shaped portion into the wall so that the first arm of the L-shaped portion is flush with the external face of the wall and allowing the elongate back portion of the wall anchor to rotate so that said elongate back portion is flush with an internal surface of the wall and parallel to the first arm of the L-shaped portion.

13. The method of claim 12, further comprising fastening a holding means through the first arm of the L-shaped portion and the elongate back portion once the anchor is deployed in the wall.

14. The method of claim 13, wherein said holding means is a screw.

15. The method of claim 13, further comprising removing the first arm of the L-shaped portion once the holding means has been fastened.

16. A kit comprising a wall anchor as claimed in claim 1 together with a holding means suitable for use with the wall anchor.

17. The kit as claimed in claim 16 wherein said holding means is a screw.

18. The wall anchor as claimed in claim 10, wherein one or each strut includes a retaining lug for retaining the resilient member.

\* \* \* \* \*